United States Patent [19]
Breed et al.

[11] Patent Number: 6,149,194
[45] Date of Patent: *Nov. 21, 2000

[54] PLASTIC FILM AIRBAG

[75] Inventors: David S. Breed, Boonton Township, Morris County; William Thomas Sanders, Rockaway Township, Morris County, both of N.J.

[73] Assignee: Automotive Technologies International, Inc., Denville, N.J.

[ * ] Notice: This patent is subject to a terminal disclaimer.

[21] Appl. No.: 09/071,801

[22] Filed: May 4, 1998

Related U.S. Application Data

[63] Continuation-in-part of application No. 08/795,418, Feb. 4, 1997, Pat. No. 5,863,068, and a continuation-in-part of application No. 08/626,493, Apr. 2, 1996, Pat. No. 5,746,446, which is a continuation-in-part of application No. 08/539,676, Oct. 5, 1995, Pat. No. 5,653,464, and a continuation-in-part of application No. 08/571,247, Dec. 12, 1995, Pat. No. 5,772,238, and a continuation-in-part of application No. 08/247,763, May 23, 1994, Pat. No. 5,505,485.

[51] Int. Cl.[7] .................................................. B60R 21/16
[52] U.S. Cl. ........................ 280/743.1; 280/729; 280/739
[58] Field of Search ............................... 280/743.1, 739, 280/731, 732, 730.1, 728.1, 738

[56] References Cited

U.S. PATENT DOCUMENTS

| | | | |
|---|---|---|---|
| 2,052,869 | 9/1936 | Coanda | 406/181 |
| 2,834,606 | 5/1958 | Bertrand | 280/730.1 |
| 3,158,314 | 11/1964 | Young et al. | 417/191 |
| 3,204,862 | 9/1965 | Hadeler | 230/95 |
| 3,370,784 | 2/1968 | Day | 230/95 |
| 3,451,693 | 6/1969 | Carey | 280/739 |
| 3,473,824 | 10/1969 | Carey et al. | 280/150 |
| 3,511,519 | 5/1970 | Martin | 280/150 |
| 3,527,475 | 9/1970 | Carey et al. | 280/739 |
| 3,573,885 | 4/1971 | Brawn | 280/150 |

(List continued on next page.)

FOREIGN PATENT DOCUMENTS

| | | | |
|---|---|---|---|
| 0 478 897 | 4/1992 | European Pat. Off. | |
| 2122019 | 11/1971 | Germany | 280/729 |
| 0317166 | 12/1988 | Japan | |
| 0041437 | 2/1989 | Japan | 280/743 R |

(List continued on next page.)

OTHER PUBLICATIONS

"Warning:Too Much Safety May Be Hazardous", Barry Meier, New York Times, Sunday, Dec. 10, 1995, Section F, p. 8.

Japan Abstract No. 5–319190, Nippon Mektron Ltd., Dec. 3, 1993.

*Primary Examiner*—Peter C. English
*Assistant Examiner*—Lynda Jasmin
*Attorney, Agent, or Firm*—Brian Roffe

[57] ABSTRACT

An inflatable occupant restraint module including a housing mounted in the vehicle and having an interior, a deployable airbag contained within the housing interior prior to deployment, an inflator coupled to the housing for inflating the airbag by supplying a gas into the airbag interior and an initiator for initiating the supply of gas into the airbag interior in response to a crash of the vehicle. The airbag includes at least one non-perforated sheet of film defining the airbag interior and a thermoplastic elastomeric material arranged at specific locations in connection with the sheet(s) of film such that the locations are thicker in comparison to an average thickness of the sheet(s) of film. Another embodiment of the inflatable occupant restraint assembly includes at least one airbag module mounted in the vehicle and having inflatable airbags, a net surrounding the airbags for retaining the same in an interior thereof, an inflator arranged in connection with the airbags for inflating the same and an initiator for initiating the inflator in response to the crash of the vehicle. The airbags preferably include the thermoplastic elastomeric material as described above. The net is made of an interlaced network of material strips and defines an interior volume less than the volume of the airbags when inflated.

26 Claims, 30 Drawing Sheets

U.S. PATENT DOCUMENTS

| | | | |
|---|---|---|---|
| 3,632,133 | 1/1972 | Hass | 280/150 |
| 3,638,755 | 2/1972 | Sack | 280/729 |
| 3,675,942 | 7/1972 | Huber | 280/738 |
| 3,702,706 | 11/1972 | Sobkow | 280/730 R |
| 3,752,501 | 8/1973 | Daniel et al. | 280/729 |
| 3,791,669 | 2/1974 | Hamilton | 280/150 |
| 3,795,412 | 3/1974 | John | 280/730.1 |
| 3,801,127 | 4/1974 | Katter et al. | 280/150 |
| 3,820,814 | 6/1974 | Allgaier et al. | 280/150 AB |
| 3,888,504 | 6/1975 | Bonn et al. | 280/150 AB |
| 3,897,961 | 8/1975 | Leising et al. | 280/730.1 |
| 3,909,037 | 9/1975 | Stewart | 280/150 |
| 3,910,595 | 10/1975 | Katter et al. | 280/150 |
| 3,938,826 | 2/1976 | Giorgini et al. | 280/150 |
| 4,043,572 | 8/1977 | Hattori et al. | 280/736 |
| 4,262,931 | 4/1981 | Strasser et al. | 280/729 |
| 4,360,223 | 11/1982 | Kirchoff | 280/729 |
| 4,394,033 | 7/1983 | Goetz et al. | 280/736 |
| 4,536,008 | 8/1985 | Brown, Jr. | 280/730.1 |
| 4,657,516 | 4/1987 | Tassy | 280/729 |
| 4,805,930 | 2/1989 | Takada | 280/739 |
| 4,833,996 | 5/1989 | Hayashi et al. | 102/530 |
| 4,877,264 | 10/1989 | Cuevas | 280/731 |
| 4,909,549 | 3/1990 | Pool et al. | 280/738 |
| 4,928,991 | 5/1990 | Thorn | 280/738 |
| 4,963,412 | 10/1990 | Kokeguchi | 280/743 R |
| 4,964,652 | 10/1990 | Karlow | 280/739 |
| 5,004,586 | 4/1991 | Hayashi et al. | 422/164 |
| 5,060,973 | 10/1991 | Giovanetti | 280/736 |
| 5,085,465 | 2/1992 | Hieahim | 280/738 |
| 5,100,172 | 3/1992 | VanVoorhies et al. | 280/738 |
| 5,129,674 | 7/1992 | Levosinki | 280/738 |
| 5,188,558 | 2/1993 | Barton et al. | 446/224 |
| 5,193,847 | 3/1993 | Nakayama | 280/738 |
| 5,207,450 | 5/1993 | Pack, Jr. et al. | 280/738 |
| 5,222,761 | 6/1993 | Kaji et al. | 280/732 |
| 5,248,275 | 9/1993 | McGrath et al. | 446/224 |
| 5,279,873 | 1/1994 | Oike | 428/35.4 |
| 5,286,054 | 2/1994 | Cuevas | 280/738 |
| 5,295,892 | 3/1994 | Felton | 446/224 |
| 5,310,215 | 5/1994 | Wallner | 280/739 |
| 5,322,322 | 6/1994 | Bark et al. | 280/730 |
| 5,322,326 | 6/1994 | Ohm | 280/737 |
| 5,332,259 | 7/1994 | Conlee et al. | 280/738 |
| 5,390,950 | 2/1995 | Barnes et al. | 280/728 B |
| 5,406,889 | 4/1995 | Letendre et al. | 102/201 |
| 5,423,571 | 6/1995 | Hawthorn | 280/738 |
| 5,464,246 | 11/1995 | Castro et al. | 280/730.2 |
| 5,470,103 | 11/1995 | Vaillancourt et al. | 280/730.1 |
| 5,480,181 | 1/1996 | Bark et al. | 280/730.2 |
| 5,505,485 | 4/1996 | Breed | 280/729 |
| 5,533,753 | 7/1996 | Abraham | 280/739 |
| 5,603,526 | 2/1997 | Buchanan | 280/739 |
| 5,653,464 | 8/1997 | Breed et al. | 280/743.1 |
| 5,704,639 | 1/1998 | Cundhill et al. | 280/739 |
| 5,725,244 | 3/1998 | Cundhill | 280/739 |
| 5,839,755 | 11/1998 | Turnbull | 280/739 |
| 5,957,485 | 9/1999 | Hirai | 280/743.1 |

FOREIGN PATENT DOCUMENTS

| | | | |
|---|---|---|---|
| 0306849 | 12/1990 | Japan | 280/743 R |
| 1370575 | 10/1974 | United Kingdom . | |
| 2316043 | 2/1988 | United Kingdom . | |
| 2263671 | 8/1993 | United Kingdom . | |
| 2282575 | 4/1995 | United Kingdom . | |
| 2289653 | 11/1995 | United Kingdom . | |
| 2323340 | 9/1998 | United Kingdom . | |
| 86/03130 | 6/1986 | WIPO . | |
| 94/22693 | 10/1994 | WIPO . | |

PLASTIC FILM AIRBAG

CROSS-REFERENCE TO RELATED APPLICATIONS

This application is a continuation-in-part of 1) U.S. patent application Ser. No. 08/626,493, filed Apr. 2, 1996 entitled "Plastic Film Airbag", now U.S. Pat. No. 5,746,446, which in turn is a continuation-in-part of U.S. patent application Ser. No. 08/539,676 filed Oct. 5, 1995, entitled "Airbag System With Self Shaping Airbag", now U.S. Pat. No. 5,653,464, of U.S. patent application Ser. No. 08/247,763 filed May 23, 1994, entitled "Plastic Film Airbag", now U.S. Pat. No. 5,505,485, and of U.S. patent application Ser. No. 08/571,247 filed Dec. 12, 1995, entitled "Efficient Airbag Module", now U.S. Pat. No. 5,772,238; and 2) U.S. patent application Ser. No. 08/795,418, now U.S. Pat. No. 5,863,068, which is itself a continuation-in-part of the '493 application.

This application is related to U.S. patent application Ser. No. 08/247,763 filed May 23, 1994, entitled "Plastic Film Airbag", now U.S. Pat. No. 5,505,485, and Ser. No. 08/571,247 filed Dec. 12, 1995 entitled "An Efficient Airbag Module", all of which are incorporated by reference herein.

BACKGROUND OF THE INVENTION

1. Field of the Invention

The present invention relates to a vehicular airbag having a low mass and made substantially from thin plastic film which is designed to deploy in a collision involving the vehicle so that if it impacts the occupant of the vehicle wherever he/she is located, it will not cause significant injury to the occupant. In order to make a film airbag of sufficiently low mass so as not to injure the occupant, it has been recognized that the film airbag must contain means to arrest the propagation of a tear so that a small hole or break in the film does not result in a catastrophic failure, i.e., cause the airbag to burst like a balloon or otherwise prevent the airbag from deploying properly. One particular method of arresting the propagation of a tear of this invention is to use a combination of an elastomeric film and reinforcement means which in certain embodiments may be the elastomeric material itself constructed in a variable thickness pattern, i.e., have thinner and thicker sections, or in a manner so that it has strategically placed thicker sections, i.e., relative to remaining portions of the material, in view of stress considerations during deployment.

2. Description of the Prior Art

A conventional driver side airbag (also referred to herein as a driver airbag) is made from pieces of either Nylon or polyester fabric that are joined together, e.g., by sewing. The airbag is usually coated on the inside with neoprene or silicone for the purposes of (i) capturing hot particles emitted by the inflator in order to prevent holes from being burned in the fabric, and (ii) sealing the airbag to minimize the leakage of an inflating gas through the fabric. These airbags are conventionally made by first cutting two approximately circular sections of a material having a coating on only one side and which will form a front panel and a back panel, and sewing them together with the coated side facing out. The back panel is provided with a hole for attachment to an inflator. Fabric straps, called tethers, are then sewn to the front panel. Afterwards, the airbag is turned inside out by pulling the fabric assembly through the inflator attachment hole placing the coated side on the inside. Assembly is completed by sewing the tethers to the back panel adjacent the inflator attachment hole.

If a conventional driver airbag is inflated without the use of tethers, the airbag will usually take an approximately spherical shape. Such an inflated airbag would protrude significantly into the passenger compartment from the steering wheel and, in most cases, impact and injure the driver. To prevent this possible injury, the tethers are attached to the front and rear panels of the airbag to restrict the displacement of the front panel relative to the back panel. The result of the addition of such tethers is an airbag that has the shape of a flat ellipsoid with a ratio of the thickness of the airbag to its diameter of approximately 0.6. In the conventional airbag, the tethers are needed since the threads that make up the airbag fabric are capable of moving slightly relative to each other. The airbag is elastic for stresses that are not aligned with the warp or woof of the fabric. As a result, the fabric would distort to form an approximate sphere in the absence of such tethers.

Moreover, the above-mentioned method of manufacturing an airbag involves a great deal of sewing and thus is highly labor intensive and, as a result, a large percentage of all driver airbags are presently manufactured in low labor cost countries such as Mexico.

Many people are now being injured and some killed by interaction with the deploying airbag (See, e.g., "Warning: Too Much Safety May Be Hazardous", New York Times, Sunday, Dec. 10, 1995, Section F, Page 8). One of the key advantages of the film airbag described in the current assignee's above-referenced patent applications is that, because of its much lower mass than conventional Nylon or polyester fabric airbags, the injury caused by this interaction with the deploying airbag is substantially reduced. In accordance with the teachings of those patent applications mentioned above, the driver airbag system can be designed to permit significant interaction with the driver. In other words, the film airbag can be safely designed to intrude substantially further into the passenger compartment without fear of injuring the driver. Nevertheless, in some cases, as disclosed in patent application Ser. No. 08/539,676, it may be desirable to combine the properties of a film airbag, which automatically attains the conventional driver airbag shape, with a fabric airbag. In such cases, interaction with the driver needs to be minimized.

Airbag systems today are designed so that ideally the airbag is fully inflated before the occupant moves into the space that is occupied by the airbag. However, most occupants are not positioned at the ideal location assumed by the airbag system designer, and also may not have the dimensions, e.g., size and weight, in the range considered for optimum airbag deployment by the airbag system designer. Many occupants sit very close to the airbags, or at least closer than expected by the airbag system designer, and as mentioned above, are injured by the airbag deployment. On the other hand, others sit far from the airbag, or at least farther away from the airbag than expected, and therefore must travel some distance, achieving a significant relative velocity, before receiving the benefit of the airbag. See for example "How People Sit in Cars: Implications For Driver and Passenger Safety in Frontal Collisions—The Case for Smart Restraints.", Cullen, E., et al $40^{th}$ Annual Proceedings, Association For the Advancement of Automotive Medicine, pp. 77–91.

With conventionally mounted airbags such as those mounted in the steering wheel or instrument panel, severe out-of-position occupant situations, where the occupant is resting against the airbag when deployment begins, can probably only be handled using an occupant position sensor, such as disclosed in the current assignee's copending patent application Ser. No. 08/505,036 (corresponding to published WO 94/22693), which is incorporated herein by reference, which prevents an airbag from deploying if an occupant is more likely to be seriously injured by the airbag deployment than from the accident itself. In many less severe accidents, the occupant will still interact with the deploying airbag and sustain injuries ranging from the mild to the severe. In addition, as mentioned above, some occupants sit very far from the steering wheel or instrument panel and, with conventional airbags, a significant distance remains between the occupant and the inflated airbag. Such occupants can attain a significant kinetic energy relative to the airbag before impacting it, which must be absorbed by the airbag. This effect serves to both increase the design strength requirements of the airbag and increase the injury induced in the occupant by the airbag. For these reasons, it would be desirable to have an airbag system that adjusts to the location of the occupant and which is designed so that the impact of the airbag causes little or no injury to the occupant.

It is conventional in the art that airbags contain orifices or vent holes for exhausting or venting the gas generated by the inflation means. Thus, typically within one second after the bag is inflated (and has provided its impact absorbing function), the gas has been completely exhausted from the bag through the vent holes. This imposes several limitations on the restraint system that encompasses the airbag system. Take for example the case where an occupant is wearing a seatbelt and has a marginal accident, such as hitting a small tree, which is sufficient to deploy the airbag, but where it is not really needed since the driver is being restrained by his seatbelt. If the driver has lost control of the car and is traveling at 30 MPH, for example, and has a secondary impact one second or about 50 feet later, this time with a large tree, the airbag will have become deflated and thus is not available to protect the occupant in this secondary life threatening impact.

In other situations, the occupant might be involved in an accident that exceeds the design capability of the restraint system. These systems are typically designed to protect an average-size male occupant in a 30-MPH barrier impact. At higher velocities, the maximum chest deceleration experienced by the occupant can exceed 60 G's and become life threatening. This is particularly a problem in smaller vehicles, where airbag systems typically only marginally meet the 60-G maximum requirement, or with larger or more frail occupants.

There are many cases, particularly in marginal crashes, where existing crash sensors will cause the airbag to deploy late in the crash. This can also result in an "out-of-position occupant" for deployment of the airbag that can cause injuries and possibly death to the occupant. Other cases of out-of-position occupants are standing children or the forward motion of occupants during panic braking prior to impact especially when they are not wearing seatbelts. The deploying airbag in these situations can cause injury or death to the out-of-position occupant. Approximately one hundred people have now been killed and countless more seriously injured by the deployment of the airbag due to being out-of-position.

It is recognized in the art that the airbag must be available to protect an occupant for at least the first 100–200 milliseconds of the crash. Since the airbag contains large vents, the inflator must continue to supply gas to the airbag to replace the gas flowing out of these vents. As a result, inflators are usually designed to produce about twice as much gas than is needed to fill the airbag. This, of course, increases the cost of the airbag system as well as its size, weight and total amount of contaminants resulting from the gases that are exhausted into the automobile environment.

This problem is compounded when the airbag becomes larger, which is now possible using the film materials of this invention, so as to impact with the occupant wherever he/she is sitting, without causing significant injury, as in the preferred implementation of the design of this invention. This then requires an even larger inflator which, in many cases, cannot be accommodated in conjunction with the steering wheel, if conventional inflator technology is utilized.

Furthermore, there is a great deal of concern today for the safety of a child in a rear facing child seat when it is used in the front passenger seat of a passenger airbag equipped vehicle. Currently used passenger side airbags have sufficient force to cause significant injury to a child sitting in such a seat and parents are warned not to use child seats in the front seat of a vehicle having a passenger side airbag. Additionally, several automobile companies are now experimenting with rear seat airbags in which case, the child seat problem would be compounded.

Airbags made of plastic film are disclosed in the copending patent applications referenced above. Many films have the property that they are quite inelastic under typical stresses associated with an airbag deployment. If an airbag is made from a pair of joined flat circular sections of such films and inflated, instead of forming a spherical shape, it automatically forms the flat ellipsoidal shape required for driver airbags as disclosed in copending U.S. patent application Ser. No. 08/539,676. This unexpected result vastly simplifies the manufacturing process for driver airbags since tethers are not required, i.e., the film airbag is made from two pieces of film connected only at their peripheral edges. Furthermore, since the airbag can be made by heat sealing two flat circular sections together at their peripheral edges without the need for tethers, the entire airbag can be made without sewing, reducing labor and production costs. In fact, the removal of the requirement for tethers permits the airbag to be made by a blow molding or similar process. Indeed, this greatly reduces the cost of manufacturing driver airbags. Thus, the use of film for making an airbag has many advantages that are not obvious.

Films having this inelastic quality, that is films with a high modulus of elasticity and low elongation at failure, tend to propagate tears easily and thus when used alone are not suitable for airbags. This problem can be solved through the addition of reinforcement in conjunction with the inelastic films such as a net material as described in the above-referenced patent applications. Other more elastic films such as those made from the thermoplastic elastomers, on the other hand, have a low modulus of elasticity and large elongation at failure, sometimes 100%, 200% or even 400%, and naturally resist the propagation of tears. Such films, on the other hand, do not form the flat ellipsoidal shape desired for steering wheel mounted driver side airbags. As discussed in greater detail below, the combination of the two types of film through attachment using lamination, successive casting or coating, or through the use of adhesives applied in a pattern can produce a material having both the self shaping and the resistance to tear propagation properties.

In addition to the above-referenced patent applications, film material for use in making airbags is described in U.S. Pat. No. 4,963,412 to Kokeguchi, which is incorporated herein by reference. The film airbag material described in the Kokeguchi patent is considerably different in concept from that disclosed in the above-referenced patent applications or the instant invention. The prime feature of the Kokeguchi patent is that the edge tear resistance, or notch tear resistance, of the airbag film material can be increased through the use of holes in the plastic films, i.e., the film is perforated. Adding holes, however, reduces the tensile strength of the material by a factor of two or more due to the stress concentration effects of the hole. It also reduces the amount of available material to resist the stress. As such, it is noteworthy that the Kokeguchi steering wheel mounted airbag is only slightly thinner than the conventional driver side fabric airbag (320 micrometers vs. the conventional 400 micrometers) and is likely to be as heavy or perhaps heavier than the conventional airbag. Also, Kokeguchi does not disclose any particular shapes of film airbags or even the airbag itself for that matter. Since his airbag has no significant weight advantage over conventional airbags, there is no teaching in Kokeguchi of perhaps the most important advantage of film airbags of the present invention, that is, in reducing injuries to occupants who interact with a deploying airbag.

As will be discussed in detail below, the airbags constructed in accordance with the present teachings attain particular shapes based on the use of the inelastic properties of particular film materials and reduce tear propagation through a variety of novel methods including the use of elastic films. It is also noteworthy that Kokeguchi discloses that vacuum methods can be used to form the airbag into the desired shape and thus fails to realize that the properties of inelastic film results in the airbag automatically forming the correct shape upon deployment. Also noteworthy is that Kokeguchi states that polymeric films do not have sufficient edge tear resistance and thus fails to realize that films can be so formulated to have this property, particularly those made from the thermoplastic elastomers. These limitations of the Kokeguchi patent results in a very thick airbag that although comprised of film layers no longer qualifies as a true film airbag as defined herein. A "film airbag" for the purposes herein is one wherein the film thickness is generally less than about 250 micrometers, and preferably even below about 100 micrometers, for use as a driver protection airbag. As the size of the airbag increases, the thickness must also increase in order to maintain an acceptable stress within the film. A film airbag so defined may also contain one or more sections that are thicker than about 250 micrometers and which are used primarily to reinforce the thinner film portion(s) of the airbag. A film airbag as defined herein may also include a layer or layers of inelastic material and a layer or layers of elastic material (i.e., thermoplastic elastomers).

The neoprene or silicone coating on conventional driver airbags, as mentioned above, serves to trap hot particles that are emitted from some inflators, such as a conventional sodium azide inflator. A film airbag may be vulnerable to such particles, depending on its design, and as a result cleaner inflators that emit fewer particles are preferred over sodium azide inflators. It is noteworthy, however, that even if a hole is burned through the film by a hot particle, the use of an thermoplastic elastomer in the film material prevents this hole from propagating and causing the airbag to fail. Also, new inflators using the pyrotechnic, hybrid or stored gas technologies, are now available which do not produce hot particles and produce gases which are substantially cooler than gases produced by sodium azide inflators. Also, not all sodium azide inflators produce significant quantities of hot particles.

One interesting point that also is not widely appreciated by those skilled in the art heretofore, is that the gas temperature from the inflator is only an issue in the choice of airbag materials during the initial stages of the inflation. The total thermal energy of the gas in an airbag is, to a first order approximation, independent of the gas temperature which can be shown by application of the ideal gas laws. When the gas initially impinges on the airbag material during the early stages of the inflation process, the temperature is important and, if it is high, care must be taken to protect the material from the gas. Also, the temperature of the gas in the airbag is important if the vent holes are located where the outflowing gas can impinge on an occupant. The average temperature of the airbag itself, however, will not be affected significantly by the temperature of the gas in the airbag.

In certain conventional airbag deployments, the propellant which is used to inflate the airbag also is used to force open a hole in the vehicle trim, called the deployment door, permitting the airbag to deploy. Since the mass of a film airbag is substantially less than the mass of a conventional fabric airbag, much less energy is required to deploy the airbag in time. However, substantial pressure is still required to open the deployment door. Also, if the pressure now used to open the deployment door is used with film airbags, the airbag velocity once the door has been opened may be substantially higher than conventional airbags. This rapid deployment can put excessive stresses on the film airbag and increases the chance that the occupant will be injured thereby. For most implementations of the film airbag, an alternate less energetic method of opening the deployment door may be required.

One such system is disclosed in Barnes et al. (U.S. Pat. No. 5,390,950) entitled "Method and arrangement for forming an air bag deployment opening in an auto interior trim piece". This patent describes a method ". . . of forming an air bag deployment opening in an interior trim piece having a vinyl skin overlying a rigid substrate so as to be invisible prior to operation of the air bag system comprising an energy generating linear cutting element arranged in a door pattern beneath the skin acting to degrade or cut the skin when activated."

The goal of the Barnes et al. patent is to create an invisible seam when the deployment door is located in a visible interior trim panel. This permits greater freedom for the vehicle interior designer to create the particular aesthetic effect that he or she desires. The invisible seam of the Barnes et al. patent is thus created for aesthetic purposes with no thought toward any advantages it might have to reduce occupant injury or advantages for use with a film airbag, or to reduce injuries at all for that matter. One unexpected result of applying the teachings of this patent is that the pressure required to open the deployment door, resulting from the force of the inflating airbag, is substantially reduced. When used in conjunction with a film airbag, this result is important since the inflator can be designed to provide only sufficient energy to deploy and inflate the very light film airbag thereby significantly reducing the size of the inflator. The additional energy required to open a conventional deployment door, above that required to open a deployment door constructed in accordance with the teachings of the Barnes et al. patent, is not required to be generated by the inflator. Furthermore, since a film airbag is more vulnerable to being injured by ragged edges on the deployment door than a conventional fabric airbag, the device of the Barnes et al. patent can be used to pyrotechnically cut open the deployment door permitting it to be easily displaced from the path of the deploying airbag, minimizing the force of the airbag against the door and thus minimizing the risk of damage to the film airbag from the deployment door. Since Barnes et al. did not contemplate a film airbag, advantages of its use with the pyrotechnically opening deployment door could not have been foreseen. Although the Barnes et al. patent discloses one deployment door opening method which is suitable for use with an airbag made from plastic film as disclosed herein, that is one which requires substantially less force or pressure to open than conventional deployment doors, other methods can be used in accordance with the invention without deviating from the scope and spirit thereof.

The discussion of the self-shaping airbag thus far has been limited to film airbags. An alternate approach is to make an airbag from a combination of fabric and film. The fabric provides the tear resistance and conventional airbag appearance. The film forces the airbag to acquire the flat ellipsoidal shape desired for driver airbags without the use of tethers and permits the airbag to be assembled without sewing using heat and/or adhesive sealing techniques. Such a hybrid airbag is made from fabric and film that have been laminated together prior to the cutting operation. Naturally, the combination of a film and net, as described in the above referenced patent applications, is equally applicable for the airbag described here and both will be referred to herein as hybrid airbags and belong to the class of composite airbags.

A finite element analysis of conventional driver side airbags (made of fabric) shows that the distribution of stresses is highly unequal. Substantial improvements in conventional airbag designs can be made by redesigning the fabric panels so that the stresses are more equalized. Today, conventional airbags are designed based on the strength required to support the maximum stress regardless of where that stress occurs. The entire airbag must then be made of the same thickness material as that chosen to withstand maximum stress condition. Naturally, this is wasteful of material and attempts have been made to redesign the airbag to optimize its design in order to more closely equalize the stress distribution and permit a reduction in fabric strength and thus thickness and weight. However, this optimization process when used with conventional fabric airbags can lead to more complicated assembly and sewing operations and more expensive woven materials and thus higher overall manufacturing costs. An example of such an airbag is that marketed by Precision Fabrics of Greensboro, N.C. Thus, there is a tradeoff between manufacturing cost and airbag optimization.

As discussed in the above-referenced patent applications as well as below, with a film airbag manufactured using blow molding techniques, for example, greater freedom is permitted to optimize the airbag vis-à-vis equalization of the stress. First, other than tooling cost, the manufacturing cost of an optimized airbag is no greater than for a non-optimized airbag. Furthermore, the thickness of the film can be varied from one part of the airbag to another to permit the airbag to be thicker where the stresses are greater and thinner where the stresses are less. A further advantage of blow molding is that the film can be made of a single constituent material. When the airbag is fabricated from sheet material, the outside layer of the material needs to be heat sealable, such as is the case with polyethylene or other polyolefin, or else a special adhesive layer is required where the sealing occurs.

As discussed in greater detail below in connection with the description of the invention, when the film for the airbag is manufactured by casting or coating methods, techniques familiar to those skilled in the art of plastics manufacturing are also available to produce a film where the thickness varies from one part to another in a predetermined pattern. This permits a film to be made that incorporates thicker sections in the form of a lattice, for example, which are joined together with thin film. Thus, the film can be designed so that reinforcing ribs, for example, are placed at the optimum locations determined by mathematical stress analysis.

One example of an inflatable film product which partially illustrates the self-shaping technology of this invention is the common balloon made from metalized "Mylar™" plastic film found in many stores. Frequently these balloons are filled with helium. They are made by heat sealing two flat pieces of film together as described in U.S. Pat. No. 5,188,558 (Barton), U.S. Pat. No. 5,248,275 (McGrath), U.S. Pat. No. 5,279,873 (Oike), and U.S. Pat. No. 5,295,892 (Felton). Surprisingly, the shape of these balloons, which is circular in one plane and elliptical in the other two planes, is very nearly the shape which is desired for a driver side airbag. This shape is created when the pressure within the balloon is sufficiently low such that the stresses induced into the film are much smaller than the stresses needed to significantly stretch the film. The film used is relatively rigid and has difficulty adjusting to form a spherical shape. In contrast, the same airbag made from woven material more easily assumes an approximate spherical shape requiring the use of tethers to create the shape which comes naturally with the Mylar balloons.

One problem with film balloons is that when a hole is punctured in the balloon it fails catastrophically. One solution to this problem is to use the combination of a film and net as described in the current assignee's above-referenced patent applications. Such materials have been perfected for use as sail material for lightweight high performance sails for sailboats. One example is marketed under the trade name Bainbridge Sailcloth SL Series™, and in particular SL 500-P™, 1.5 mill. This material is a laminate of a film and a net. Such materials are frequently designed to permit heat sealing thereby eliminating threads and the stress concentrations associated therewith. Heat sealing also simplifies the manufacturing process for making sails. Another preferable solution is to make the airbags from a film material which naturally resists tears, that is, one which is chemically formulated to arrest a tear which begins from a hole, for example. Examples of films which exhibit this property are those from the thermoplastic elastomer (TPE) families such as polyurethane, Ecdel elastomer from Eastmen, polyester elastomers such as HYTREL™ and some metallocene catalyzed polyolefins. For the purposes herein, a thermoplastic elastomer will include all plastic films which have a relatively low modulus of elasticity and high elongation at failure, including but not limited to those listed above.

Applications for the self shaping airbag described herein include all airbags within the vehicle which would otherwise required tethers or complicated manufacturing from several separate panels. Most of these applications are more difficult to solve or unsolvable using conventional sewing technology. The invention described herein solves some of the above problems by using the inelastic properties of film, and others by using the elastic properties of thermoplastic elastomers plus innovative designs based on analysis including mathematical modeling plus experimentation. In this manner, the problems discussed above, as well as many others, are alleviated or solved by the airbags described in the paragraphs below. Films for airbags which exhibit both the self shaping property and also formulated to resist the propagation of a tear are made by combining a layer of high modulus material with a layer of a thermoplastic elastomer. Then if a tear begins in the combined film it will be prevented from propagating by the elastomer yet the airbag will take the proper shape due to the self-shaping effect of the high modulus film.

Other relevant prior art includes the following, with a brief explanation of the pertinence of the reference to the present invention:

U.S. Pat. No. 3,511,519 (Martin) describes a large fabric airbag which is shown impacting the occupant. It does not discuss the problem of injury to the occupants due to the impact of the airbag.

U.S. Pat. No. 3,573,885 (Brawn) shows a blowout patch assembly but not variable exhaust orifices.

U.S. Pat. No. 3,820,814 (Allgaier) discloses variable exhaust vents located within the fabric airbag material.

U.S. Pat. No. 3,888,504 (Bonn) illustrates an inflatable occupant restraint airbag which is comprised at least in part of a woven stretch fabric which is permeable to fluid used to inflate the bag, the bag having a variable porosity which increases and decreases in relation to the fluid pressure within the bag.

U.S. Pat. No. 4,262,931 (Strasser) illustrates two airbags joined together to cover right and center seating positions.

U.S. Pat. No. 4,360,223 (Kirchoff) discloses a low-mount, air bag module for the passenger side of an automobile that uses two bags that are folded within a housing that is open at one end. One of the bags is for restraining the knees of the passenger to prevent forward sliding in the event of a crash, the other bag being for restraining the torso. The knee bag is inside the torso bag and they are both attached directly to the inflator, the knee bag being arranged to be inflated first. The torso bag then is inflated to prevent forward rotation of the passenger from the hips.

Further, in accordance with the Kirchoff invention, a pressure responsive orifice means is provided in a second opening in the wall of the knee bag. This orifice means controls the flow of gas through the opening in the wall of the knee bag thereby to insure a predetermined gas pressure within the knee bag, while permitting subsequent inflation of the torso bag by gases passing into the torso bag through the orifice means. Thus, a knee bolster airbag is disclosed but it is positioned inside of the main torso airbag and inflated by the same inflator.

U.S. Pat. No. 4,394,033 (Goetz) discloses a temperature compensation system. The claimed inflatable occupant-restraint system in a vehicle includes a generator for producing fluid under pressure placed such that a portion of the generator is outside the cushion and has a resilient venting means for dumping increasing fractions of gas volume outside the cushion at increasing operating temperatures.

U.S. Pat. No. 4,805,930 (Takada) discloses a temperature compensation system. Further, it describes stitched thread seams between fabric elements of the envelope of a vehicle safety air bag which induce localized distension and opening up of the envelope fabrics along the seams, thereby causing the film coatings of the envelope fabric to rupture along the seam and allow gas to escape and maintain a substantially constant overall maximum pressure, regardless of variations in ambient temperature.

U.S. Pat. No. 3,451,693 (Carey) does not disclose plastic film, merely plastic. The distinguishable properties of film are numerically described in the instant specification and basically are thinner and less weight. Carey does disclose variable exhaust orifice means at col. 3, 11. 63+ to maintain constant pressure in the airbag as the occupant is thrown into the airbag. However, the material is not plastic film with means to arrest the propagation of a tear. In fact, it is unclear in Carey as to whether the orifice means therein is repeatable/reusable and no mention is made as to whether the stretching of the orifice means area is permanent or temporary.

U.S. Pat. No. 3,638,755 (Sack) discloses a two-bag airbag combination, with one bag contained within the other.

U.S. Pat. No. 3,675,942 (Huber) discloses a unidirectional valve which permits air to enter the bag, but prevents its escape in the event the pressure within the bag exceeds that of the atmosphere within the vehicle, such as by the impact of a person with the bag.

U.S. Pat. No. 3,752,501 (Daniel) discloses an inflatable cushion device for protective interposition between a vehicle operator and the rim and hub of a vehicle steering wheel assembly. The cushion is compartmented to provide, when inflated, peripheral ring compartmentation in juxtaposition to the steering wheel rim and center compartmentation in overlying juxtaposition to the steering wheel hub. The peripheral ring compartmentation when pressurized provides greater resistance to collapse than the center compartmentation, whereby the peripheral ring compartmentation is adapted to guide the vehicle operator upon contact of the latter with the cushion toward the center compartmentation thereby to maintain the vehicle operator in substantially centered cushioned relationship to the steering wheel assembly under vehicle impact conditions. This air bag contains two compartments; an outer, donut-shaped ring or torus and an inner compartment of somewhat larger volume. This is an example of a bag within a bag where an outer bag is connected to an inner bag by flapper valves.

U.S. Pat. No. 4,964,652 (Karlow) discloses a system for venting excessively high pressure gas incident to deployment of an airbag comprising a diaphragm that is rupturable upon the occurrence of a threshold pressure internally of the airbag to instantaneously release the pressure. This is a pressure relief system through the center of the module.

Japanese Patent No. 89-090412/12 describes fabricated cloths are laminated in layers at different angles to each other's warp axis to be integrated with each other. Strength and isotropy are improved. The cloth is stated as being useful for automotive air bags for protecting the passenger's body.

U.S. Pat. No. 5,322,326 (Ohm) describes a small limited protection airbag manufactured in Korea. Although not disclosed in the patent, it appears to use a plastic film airbag material made from polyurethane. It is a small airbag and does not meet the United States standards for occupant protection (FMVSS-208). The film has a uniform thickness and if scaled to the size necessary for meeting U.S. Standards it would likely become of comparable thickness and weight as the current fabric airbags.

OBJECTS AND SUMMARY OF THE INVENTION

A principal object of this invention is to form an airbag from flat sheets of film or composite material, or by blow molding or a similar process in order to create an airbag for use to protect occupants in the event of a crash of the vehicle, which may be substantially larger than current airbags and which may be designed to interact with the occupant regardless of where he/she is positioned without causing significant injury and thereby to improve the protection provided by the airbag. One of the materials for the airbag is chosen from the class of plastic materials known as thermoplastic elastomers which includes, among others, polyurethane, polyester elastomer and metallocene-catalyzed polyolefin. A plastic material is called an elastomer when its elongation prior to failure is large, sometimes as large as 100%, 200%, 400% or more. The driver airbag version uses the inelastic properties of a layer of the film material to cause the airbag to attain the desired shape without requiring the use of tethers. As a driver side airbag, for example, it can be substantially elliptical in two orthogonal planes and circular in a third orthogonal plane. If a composite material composed of film and a net, an inelastic film and an elastic film, or film and a fabric, is used to form a hybrid design, the relatively inelastic properties of the film are used to create the desired flat elliptical shape, for example, while the net, elastic film or fabric is used to provide other desirable features including tear resistance.

Other objects and advantages of this invention include:

1. To provide an airbag which can be manufactured without the use of sewing or other manually intensive operations.

2. To provide an airbag which is considerably lighter and smaller, when folded in the inoperative condition, than current fabric airbags.

3. To provide a driver airbag which does not require the use of tethers.

4. To provide an airbag for use on the front passenger side of the vehicle which can be easily manufactured from a minimum number of parts without the use of sewing.

5. To provide a substantially conventional driver fabric airbag which can be manufactured without the use of tethers.

6. To provide an airbag which can be manufactured using a low cost blow molding or similar technology.

7. To provide an airbag which has been optimized to substantially equalize the stresses in the material thereof.

8. To provide an airbag where the material thickness is varied to reduce the stress in the high stress areas of the airbag.

9. To provide an airbag where optimization procedures have been used to substantially eliminate folds and wrinkles in the surface of the inflated airbag.

10. To provide an airbag comprising film where the thickness to diameter ratio is less than 0.7 without the use of tethers and, in some cases, less than 0.6.

11. To provide a very low cost airbag, with respect to the fabrication thereof.

12. To provide a method of manufacturing an airbag permitting any desired shape airbag to the manufactured from flat panels.

13. To provide an airbag where at least one layer is made from a thermoplastic elastomer which is substantially lighter than conventional fabric airbags.

14. To provide an airbag module which is substantially less injurious to out-of-position occupants during airbag deployment.

15. To utilize thin film airbags in a manner which eliminates the catastrophic bursting of the film in the event of an inadvertent puncture.

16. To provide a plastic film airbag where the thickness is varied in a desired pattern, e.g., a pattern of thicker reinforcement sections and spanning sections of thin film.

17. To provide an airbag system which automatically adjusts to the presence of a child seat.

18. To reduce the injury potential to an out-of-position occupant from the deploying airbag.

19. To provide an airbag module utilizing the combination of an airbag made substantially of film and a pyrotechnically opening deployment door.

20. To provide an occupant restraint airbag system for a single occupant which is composed of a plurality of airbags.

21. To provide an airbag system for the protection of an occupant which automatically adjusts to the occupant's seating position.

22. To provide an airbag system which exhausts back through the inflator structure thereby eliminating the need for vent holes in the airbag.

23. To provide a method of containing a plurality of airbags through the use of a net structure.

24. To provide an airbag system having a variable exit orifice to reduce occupant injury including chest and head maximum accelerations, to reduce the amount of propellant required, and to permit more efficient use of the airbag deflation.

25. To provide a simple construction method for an airbag composed of several airbags.

26. To provide an airbag design which will be available in the event of multiple impacts where the airbag is not fully utilized during the initial impact.

27. To retain the gas in the airbag for a substantial period of time until it is impacted by an occupant.

28. To minimize the total amount of gas and contaminants produced by all of the inflators in the vehicle.

It is also an underlying object of the invention to provide a new airbag module in which the disadvantages of prior art systems are overcome. Thus, one embodiment of the airbag module in accordance with the invention includes several features, namely: (i) an airbag made from plastic film, (ii) using a larger airbag which is designed to interact with the occupant without causing significant injury, (iii) using a material which has a relatively low elastic modulus, (iv) varying the thickness of the material in a pattern which provides a reinforcement structure which is bridged by sections of thin film of the same material as the reinforcements. Such an airbag system construction solves the problems with the prior art and offers substantially greater protection to the vehicle occupant in the event of a crash of the vehicle. In the prior art, it has not been suggested that an airbag should be designed to interact with the occupant regardless of his/her location within the front passenger compartment of the vehicle and that the injury which occurs during the deployment phase of the airbag can be substantially reduced through this combination of features. Also, in the prior art, it has not been suggested that the material used for the airbag should have a thickness which varies substantially from one part of the airbag to another, i.e., a variable thickness pattern of the material.

Other objects and advantages of the present invention will become apparent from the following description of the preferred embodiments taken in conjunction with the accompanying drawings.

One embodiment of the inflatable occupant restraint module in accordance with the invention comprises a housing mounted in the vehicle and having an interior, a deployable airbag contained within the housing interior prior to deployment, inflation means coupled to the housing for inflating the airbag, e.g., gas supply means for supplying a gas into an interior of the airbag, attachment means for attaching the airbag to and in fluid communication with the inflation means, and initiation means for initiating the gas supply means to supply the gas into the airbag interior in response to a crash of the vehicle. In accordance with the invention, the airbag comprises at least one non-perforated sheet of film defining the airbag interior and tear propagation arresting means arranged in connection with the film sheet (s) for arresting the propagation of a tear therein. The tear propagation arresting means comprise a thermoplastic elastomeric material arranged at specific locations such that these locations are thicker in comparison to an average thickness of the film sheet(s) and which are selected, e.g., in view of considerations of stress on the film sheet(s) during deployment of the airbag.

In one embodiment of the method for protecting an occupant in a crash by means of an inflatable restraint, the method comprises the steps of arranging an inflatable airbag comprising at least one sheet of film in a housing, arranging in connection with the film sheet(s) a thermoplastic elastomeric material at specific locations such that these locations are thicker in comparison to an average thickness of the film sheet(s), selecting the locations at which the thermoplastic elastomeric material is arranged in connection with the film sheet(s) in view of considerations of stress on the film sheet(s) during deployment of the airbag, and initiating gas supply means to supply the gas into an interior of the airbag in response to a crash of the vehicle.

Another embodiment of the inflatable occupant restraint module comprises a housing mounted in the vehicle and having an interior, a deployable airbag contained within the housing interior prior to deployment, inflation means coupled to the housing for inflating the airbag, e.g., gas supply means for supplying a gas into an interior of the airbag defined between the first and second sheets, attachment means for attaching the airbag to and in fluid communication with the inflation means, and initiation means for initiating the gas supply means to supply the gas into the interior of the airbag in response to a crash of the vehicle. The airbag comprises first and second attached material sheets, each comprising at least one layer of non-perforated inelastic film substantially coextensive therewith and thermoplastic elastomeric material arranged in connection with the layer(s) of inelastic film and extending over at least a portion of the sheet. The thermoplastic elastomer constitutes tear propagation arresting means for arresting the propagation of a tear in the layer(s) of inelastic film.

A similar method in accordance with the invention for protecting an occupant in a crash by means of an inflatable restraint comprises the steps of arranging an inflatable airbag comprising first and second attached material sheets in a housing, each comprising at least one layer of non-perforated inelastic film substantially coextensive with the sheet, incorporating an elastic material into at least a portion of the first and second sheets, the elastic material being connected to the layer(s) of inelastic film and arresting the propagation of a tear in the layer(s) of inelastic film, and initiating gas supply means to supply the gas into an interior of the airbag defined between the first and second material sheets in response to a crash of the vehicle.

In yet another important embodiment of the invention, the vehicle has a ceiling extending across a passenger compartment above windows of the vehicle and the inflatable occupant restraint module comprises a housing mounted in the vehicle on a side of the ceiling along a lateral side of the vehicle, a deployable airbag contained within the interior of the housing prior to deployment, the airbag being mounted entirely above the windows of the vehicle and structured and arranged to deploy in a downward direction from the ceiling and extending at least substantially along the entire side of the ceiling, inflation means coupled to the housing for inflating the airbag, e.g., gas supply means for supplying a gas into an interior of the airbag, attachment means for attaching the airbag to and in fluid communication with the inflation means, and initiation means for initiating the gas supply means to supply the gas into the interior of the airbag in response to a crash of the vehicle.

In other embodiments, the inflatable occupant restraint device in an occupant protection system of a vehicle in accordance with the invention comprises a housing mounted in the vehicle and having an interior, at least one deployable airbag contained within the housing interior prior to deployment, inflation means coupled to the housing for inflating the airbag, the inflation means comprising gas generation means for generating a gas adapted to flow into an interior of the airbag, attachment means for attaching the airbag to and in fluid communication with the inflation means and initiation means for initiating the gas generation means to generate the gas in response to a crash of the vehicle. The airbag comprises a first non-perforated sheet of film and a means arranged in connection with the first film sheet for arresting the propagation of a tear therein. The means is selected from the group consisting of (i) a net or network of at least bi-directional material strips in which case the strips may be formed by varying the thickness of the film material itself and (ii) a second non-perforated sheet of film having a significantly lower elastic modulus than the first sheet. The net or network is integral with the airbag during and after deployment thereof and is attached to the housing. The net or network may be contained within the housing interior prior to deployment and comprises an interlaced network of at least bi-directionally arranged material strips, or thicker sections of the film material, i.e., an interlaced or intercrossed network. In some other embodiments, where the self-shaping property is not required, the entire airbag may be made from sheets of elastomeric plastic film wherein the thickness of the material is varied in a pattern. Alternately, the interlaced network of material strips or variations in material thickness can comprise a mesh of densely packed random fibers arranged in a multitude of directions or a mesh of densely packed crystalline polyamide fibers arranged in a multitude of directions. In still other embodiments, the airbag comprises at least two pieces of substantially flat thermoplastic film having peripheral edges, at least one of which has varying thickness, a first one of the pieces of thermoplastic film having at least one port; first attachment means for attaching the pieces of thermoplastic film together only at the peripheral edges to form a substantially sealed airbag, inflating means for inflating the airbag by directing gas into an interior of the airbag through the port(s), coupling means for coupling the airbag to the inflating means; initiation means for initiating the inflation means in response to a crash of the vehicle to thereby cause deployment of the airbag, and second attachment means for attaching the inflating means to the vehicle. In this manner, upon inflation of the airbag by the inflating means, the pieces of elastic plastic film deform substantially.

With respect to specific parts of the vehicle to which the airbag may be attached, suitable parts include the steering wheel of the vehicle, the headliner of the vehicle and an instrument panel of the vehicle. The airbag when deployed from the headliner preferably extends substantially across a major portion of the front seat of the vehicle if not the entire front seat. Alternately, it may extend along the side of the vehicle interior so as to protect the occupants of both the front and rear seat from injury and additionally offer substantial protection by preventing occupants from being ejected from the vehicle even though the windows have broken.

In other embodiments, the airbag includes means for preventing the propagation of a tear, such as (i) the incorporation of an elastomeric film material, a laminated fabric, or net, which are connected to each of the pieces of plastic film (e.g., the inelastic film which provides the desired shape upon deployment of the airbag), or (ii) means incorporated into the formulation of the plastic film material itself Also, the two pieces of film may be formed as one integral piece by a blow molding or similar thermal forming process.

BRIEF DESCRIPTION OF THE DRAWINGS

The following drawings are illustrative of embodiments of the invention and are not meant to limit the scope of the invention as encompassed by the claims.

DETAILED DESCRIPTION OF THE PREFERRED EMBODIMENTS

Figure 1:
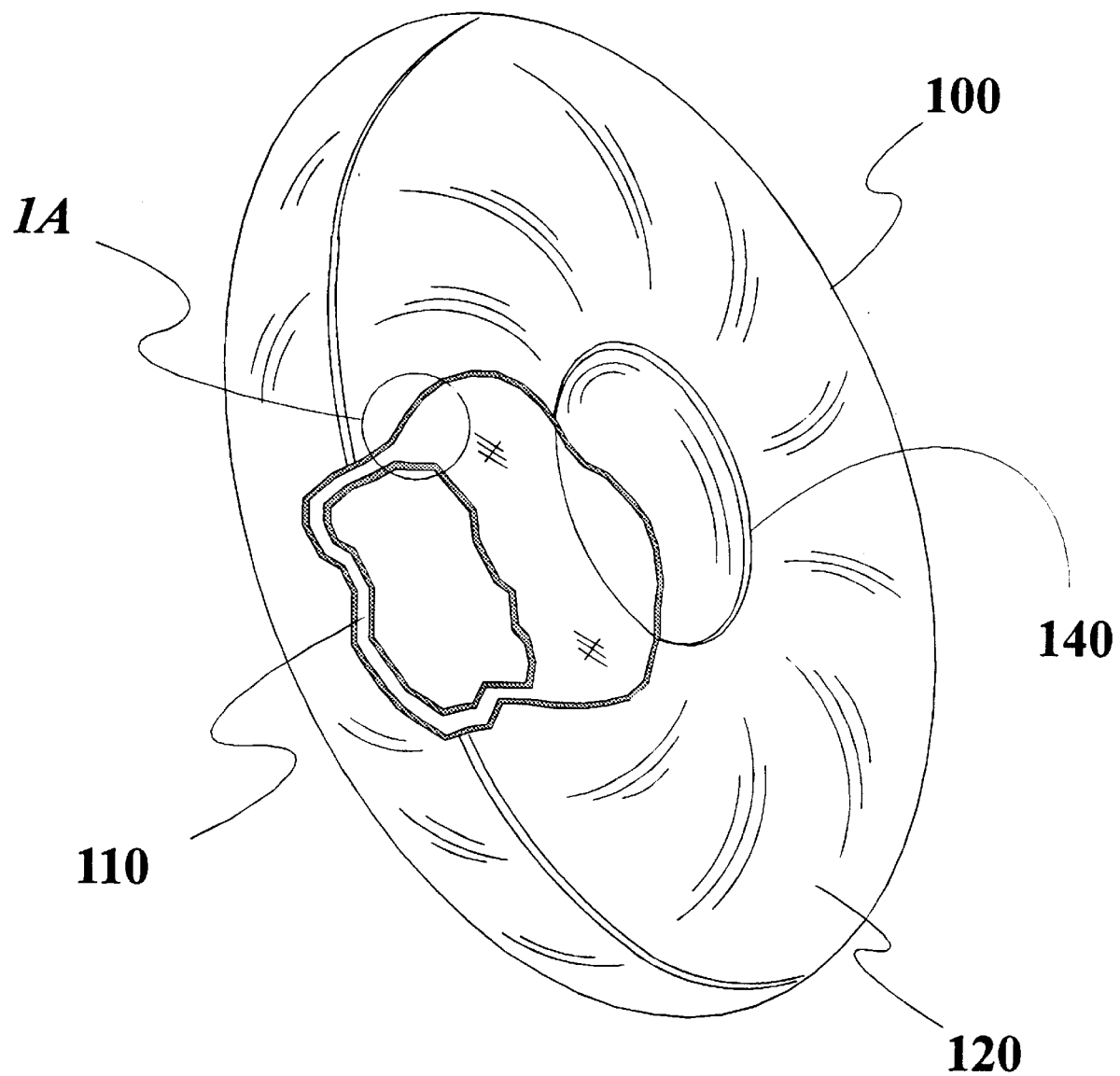
FIG. 1 is a perspective view with portions cut away and removed of a film airbag wherein the film is comprised of at least two layers of material which have been joined together by a process such as co-extrusion or successive casting or coating.

A fundamental problem with the use of plastic films for airbags is that when a single conventional plastic film is used and a tear is introduced into the film, the tear propagates easily and the airbag fails catastrophically upon deployment. As noted above, this invention is concerned with various methods of eliminating this problem and thus of permitting the use of films for airbags with the resulting substantial cost and space savings as well as a significant reduction in injuries to occupants. The reduction in occupant injury arises from the fact that the film is much lighter than the fabric in a conventional airbag and it is the mass of the airbag traveling at a high velocity which typically injures the out-of-position occupant. Also, since the airbag is considerably smaller than conventional airbags, the module is also smaller and the total force exerted on the occupant by the opening of the deployment door is also smaller further reducing the injuries to severely out-of-position occupants caused by the initial stages of the airbag deployment. Finally, in some preferred implementations of this invention the airbag is mounted onto the ceiling of the vehicle making it very difficult for an occupant to get into a position as to be injured by the opening of the deployment door. Ceiling mounting of conventional fabric airbags is not practical due their excessive size. Ceiling mounting of fall protection film airbags, on the other hand, is practical based on the use of the materials and particularly the reinforcements disclosed here.

One method of solving the tear problem is to use two film airbags or two airbag layers, one inside the other, where the airbags or layers are attached to each other with an adhesive which is strong enough to hold the two airbags or layers closely together but not sufficiently strong to permit a tear in one airbag or layer to propagate to the other. If a tear is initiated in the outer airbag or layer, for example, and the material cannot support significant tensile stresses in the material close to the tear, the inner airbag or layer must accommodate the increased tensile stress until it can be transferred to the outer layer at some distance from the tear. If the tear is caused by a small hole, this increased stress in the inner bag may only occur for a few hole diameters away from the hole. If the inner airbag is also made from a thermoplastic elastomer and the outer airbag layer is made from a less elastic material, the outer material can cause the airbag to take on a particular desired shape and the inner airbag is used to provide the tear resistance.

The problem which arises with this system when both film layers have high elastic moduli and the cause of the tear in one airbag also causes a tear in the second airbag is solved if one of the materials used for the two airbags has a low modulus of elasticity, such a thermoplastic elastomer. In this case, even though a tear starts in both airbags at the same time and place, the tear will not propagate in the thermoplastic elastomer and thus it will also be arrested in the high modulus material a short distance from the hole initiation point. An example of a two layer airbag construction is illustrated in FIG. 1 which is a perspective view with portions cut away and removed of a film airbag made from two layers or sheets of plastic film material, which are preferably substantially coextensive with one another.

Figure 1A:
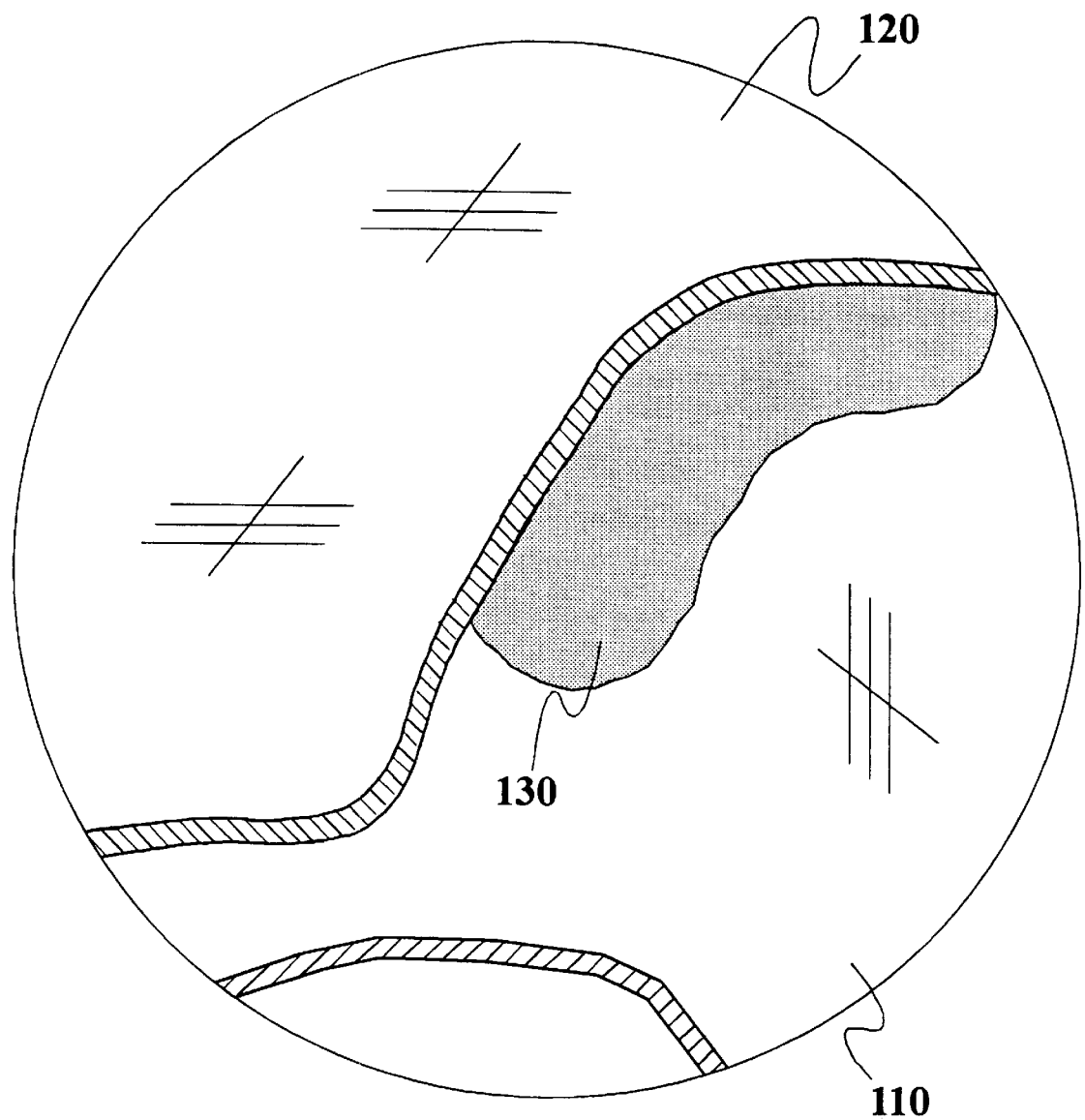
FIG. 1A is an enlarged view of the inner film airbag layer and outer film airbag layer taken within circle 1A of FIG. 1.

In FIG. 1, the driver airbag is shown in the inflated condition generally at 100 with one film layer 110 lying inside a second film layer 120. The film layers 110, 120, or sheets of film laminated or otherwise attached together, are non-perforated and are also referred to as airbags herein since they constitute the same. FIG. 1A is an enlarged view of the material of the inner layer 110 and outer layer 120 taken within circle 1A of FIG. 1. When manufactured, the film of the inner layer may be made from a thermoplastic elastomer such as polyurethane, for example, as shown in FIG 1A, and the outer layer may be made from a more rigid material such as nylon or polyester. The two film layers are held together along their adjacent regions by adhesive means such as an adhesive 130 applied in a manner sufficient to provide adherence of the two film layers together. In FIG. 1 a driver side airbag is illustrated where the bag is formed from two flat pieces of material and a center cylindrical piece 140 all of which are joined together using heat sealing with appropriate reinforcement at the heat sealed joints. Heat sealing entails the application of heat to one or both of the surfaces to be joined. In most implementations, the center cylindrical piece 140 is not required as taught in co-pending patent application Ser. No. 08/539,676 cross-referenced above.

The example of FIG. 1 is meant to be illustrative of a general technique to minimize the propagation of tears in a composite film airbag. In an actual airbag construction, the process can be repeated several times to create a composite airbag composed of several layers, each adjacent pair of layers optionally joined together with adhesives. For the purposes of this disclosure, the term "composite airbag" will mean a film airbag composed of two or more layers which may or may not be joined together including cases where the layers are joined during an extrusion processing step such as in coextrusion, by a casting process, progressive coating process, or where a film layer is combined with another reinforcing material such as fibers or a woven or molded net.

The materials used for the various film layers can be the same or different and are generally made from nylon, polyethylene or polyester, for the high modulus component and from polyurethane, polyester elastomer such as HYTREL™ or other thermoplastic elastomers for the low modulus component, although other materials could also be used. The use of different materials for the different layers has the advantage that tear propagation and strength properties can complement each other. For example, a material which is very strong but tears easily can be used in conjunction with a weaker material which requires a greater elongation before the tear propagates. Alternately, for those cases where self-shaping is not necessary, all layers can be made from thermoplastic elastomers which expand upon inflation and do not maintain any set shape.

In the implementation of FIG. 1, the adhesive 130 has been applied in a uniform coating between the film layers. In some cases, it is preferable to place the adhesive in a pattern so as to permit a tear to propagate a small distance before the stress is transferred between layers. This permits the stress concentration points to move a small distance away from each other in the two films and further reduces the chance that a catastrophic failure will result. Thus, by selecting the pattern of the application of the adhesive and/or the location(s) of application of the adhesive, it is possible to control the propagation of a tear in the composite airbag.

Figure 1B:
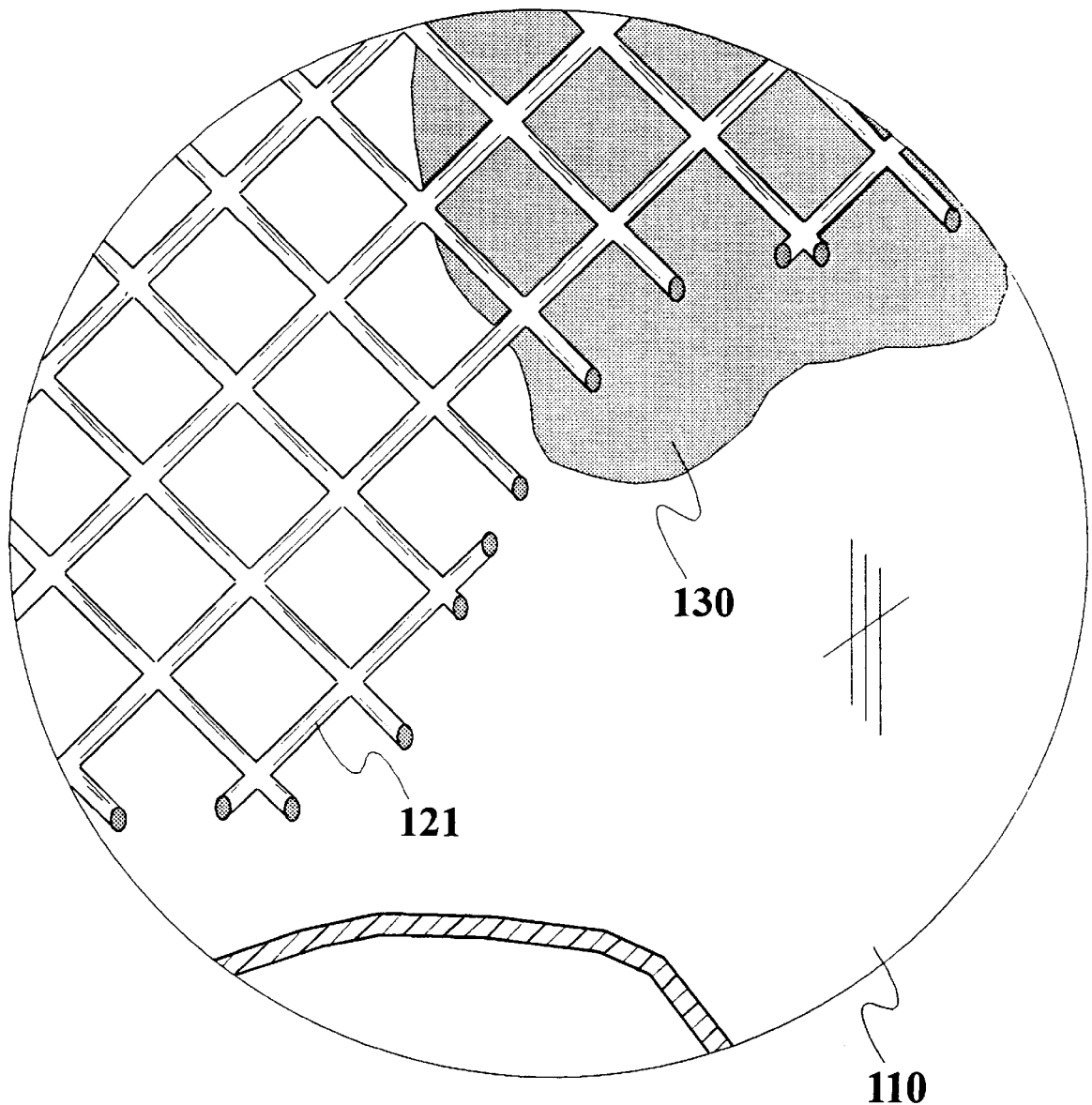
FIG. 1B is an enlarged view of the material of the inner film airbag and outer film airbag taken within circle 1A of FIG. 1 but showing an alternate configuration where the outer airbag layer has been replaced by a net.

FIG. 1B illustrates an alternate configuration of a composite airbag where the outermost airbag has been replaced by a net 121. There may be additional film layers beneath the layer 110 in this embodiment. A "net" is defined for the purposes of this application as an interlaced or intercrossed network of material, e.g., strips of material which cross one another. The interlacing may be generated, e.g., by weaving discrete elongate strips of material together or by molding, casting, progressive coating or a similar process in which case the material is molded into the network to provide an intercrossed structure upon formation. Additionally, the net may be formed integrally with the film material in which case it appears as a substantial change in material thickness from the net and film portions of the material to the only film portions of the material. The strips of material may be joined at the intersection points in the event that discrete material strips are woven together. In the illustrated embodiment, the material strips which constitute the net are oriented in two directions perpendicular to one another. However, it is within the scope of the invention to have a net comprising material strips oriented in two, non-perpendicular directions (at an angle to one another though) or three or more directions so long as the material strips are interlaced with each other to form the net. Additionally, the net pattern can vary from one portion of the airbag to another with the particular location and orientation determined by analysis to minimize stress concentrations, eliminate wrinkles and folds, or for some other purpose. Also, it is understood that the net has openings surrounded by material having a thickness and width substantially smaller than the openings.

The net 121 may be an integral part of the airbag 110 or it can be attached by an adhesive 130, or by another method such as heat sealing, to the inner airbag 110 or it can be left unattached to the inner airbag 110 but nevertheless attached to the housing of the airbag system. In this case, the stress in the inner airbag 110 is transferred to the net 121 which is designed to carry the main stress of the composite airbag and the film is used mainly to seal and prevent the gas from escaping. Since there is very little stress in the inner film layer 110, a tear will in general not propagate at all unless there is a failure in the net structure. The net 121 in this illustration has a mesh structure with approximately square openings of about 0.25 inches. Naturally this dimension will vary from design to design. The adhesive also serves the useful purpose of minimizing the chance that the net 121 will snag buttons or other objects which may be worn by an occupant. The design illustrated in FIG. 1B shows the net on the outside of the film. Alternately, the net may be in the inside, internal to the film layer 110, especially if it is created by variations in thickness of one continuous material.

In one embodiment, the net 121 is attached to the housing of the airbag 110 and is designed to enclose a smaller volume than the volume of the airbag 110. In this manner, the airbag will be restrained by the net 121 against expansion beyond the volumetric capacity of the net 121. In this way, stresses are minimized in the film permitting very thin films to be used, and moreover, a film having a higher elastic modulus can be used.

Figure 1C:
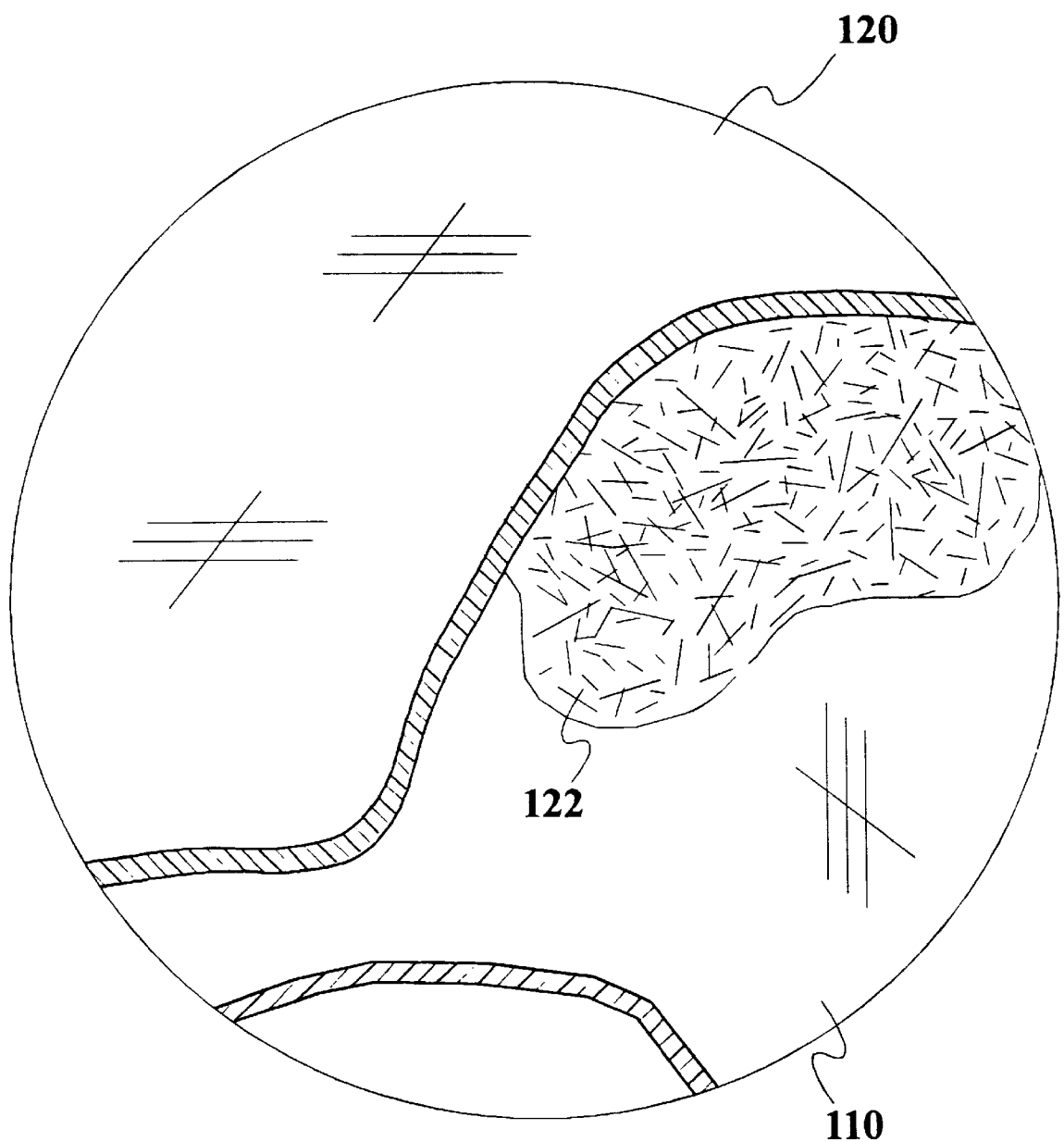
FIG. 1C is an enlarged view of the material of the inner film airbag layer and outer film airbag layer taken within circle 1A of FIG. 1 but showing an alternate configuration where fibers of an elastomer are incorporated into an adhesive layer between the two film layers.

Many other variations are possible. In one alternative embodiment, for example, the net 121 is placed between two layers of film so that the outer surface of the composite airbag is smooth, i.e., since the film layer is generally smooth. In another embodiment shown in FIG. 1C, fibers 122 of an elastomer or other suitable material, are randomly placed and sealed between two film layers 110,120 (possibly in conjunction with the adhesive). In this illustrated embodiment, the fibers 122 act to prevent the propagation of tears in much the same manner as a net. The net 121 may also be constructed from fibers.

Figure 1D:
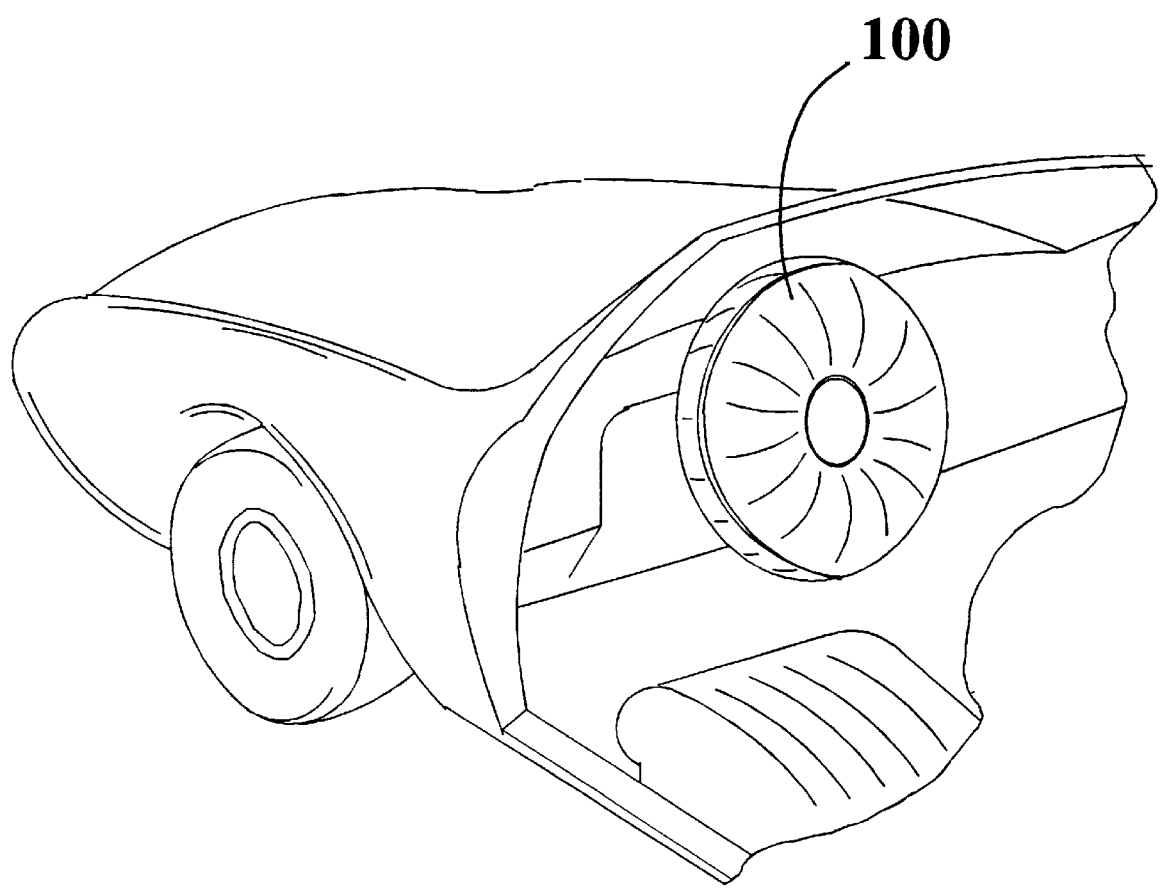
FIG. 1D is a perspective view with portions cut away of a vehicle showing the driver airbag of FIG. 1 mounted on the steering wheel and inflated.

The driver airbag 100 of FIG. 1 is shown mounted on a vehicle by conventional mounting means (not shown) in the driver side position and inflated in FIG. 1D.

It is understood that the airbag 100 is arranged prior to deployment in a module or more specifically in a housing of the module and further that the interior of the airbag is adapted to be in fluid communication with inflation means for inflating the airbag, e.g., gas generation means. Thus, the inflation means are coupled in some manner to the housing. Also, the module includes initiation means for initiating the gas generation means in response to a crash of the vehicle. This structure is for the most part not shown in the drawings but is included in connection with all of the airbag concepts disclosed herein.

Figure 2:
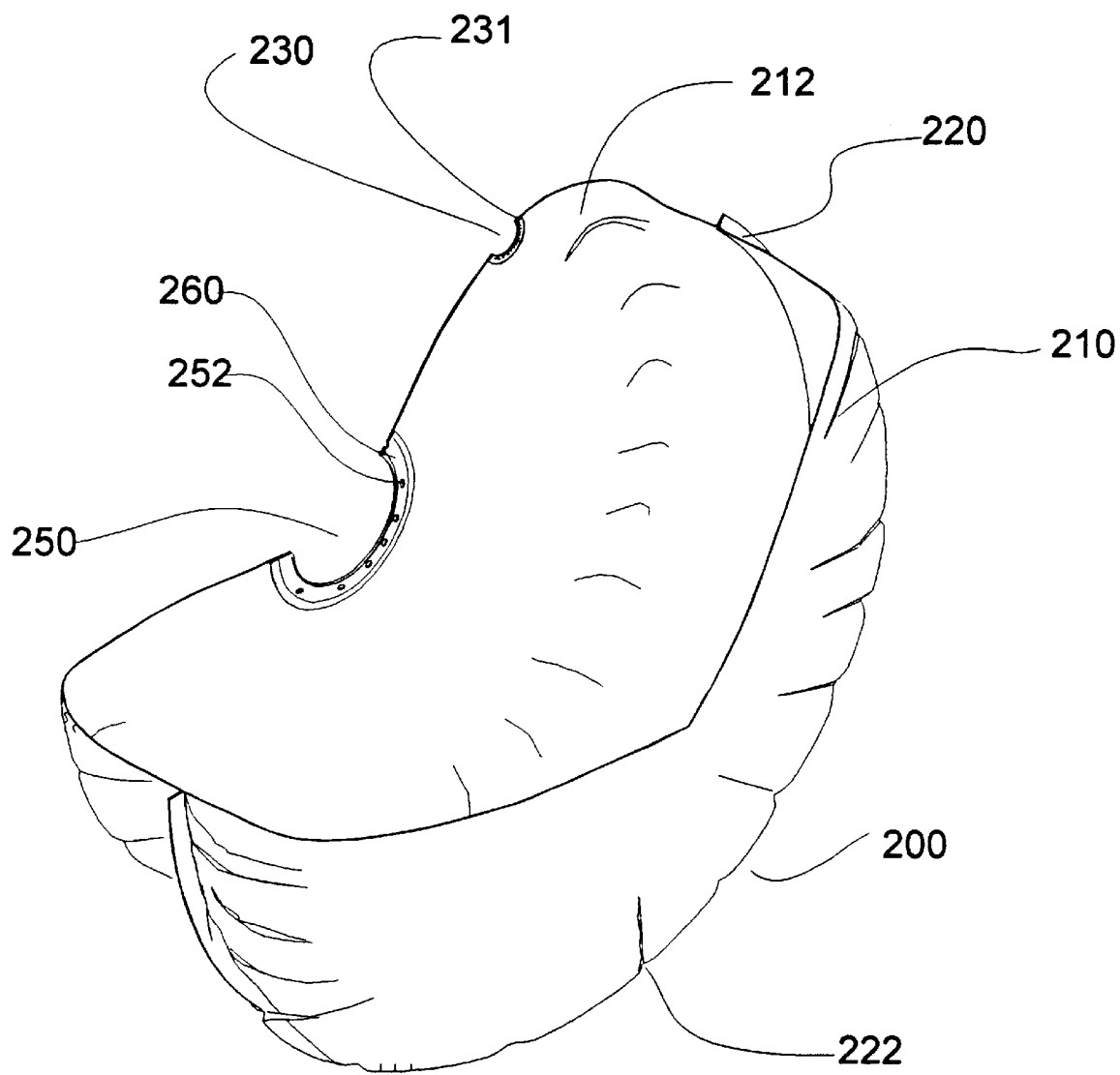
FIG. 2 is a partial cutaway perspective view of a driver side airbag made from plastic film.

An airbag made from plastic film is illustrated in FIG. 2 which is a partial cutaway perspective view of a driver side airbag 200 made from film. This film airbag 200 is constructed from two flat disks or sheets of film material 210 and 212 which are sealed together by heat welding or an adhesive to form a seam 220. A hole 250 is provided in one of the disks 212 for attachment to an inflator (not shown). This hole 250 is reinforced with a ring of plastic material 260 and holes 252 are provided in this ring 260 for attachment to the inflator. A vent hole 230 is also provided in the disk 212 and it is surrounded by a reinforcing plastic disk 231. Since this airbag is formed from flat plastic sheets 210 and 212, an unequal stress distribution occurs causing the customary wrinkles and folds 222.

Several different plastic materials are used to make plastic films for balloons as discussed in U.S. Pat. Nos. 5,188,558, 5,248,275, 5,279,873, and 5,295,892, which are incorporated by reference herein. These films are sufficiently inelastic that when two flat disks of film are joined together at their circumferences and then inflated, they automatically attain a flat ellipsoidal shape. This is the same principle used herein to make a film airbag, although the particular film materials chosen are different since the material for an airbag has the additional requirement that it cannot fail during deployment when punctured.

When the distinction is made herein between an "inelastic" film airbag and an elastic airbag, this difference in properties is manifested in the ability of the untethered elastic airbag to respond to the pressure forces by becoming approximately spherical with nearly equal thickness and diameter while the inelastic film airbag retains an approximate ellipsoidal shape, or other non-spherical shape in accordance with the design of the inelastic film airbag, with a significant difference between the thickness and diameter of the airbag.

An analysis of the film airbag shown in FIG. 2 shows that the ratio of the thickness to the diameter is approximately 0.6. This ratio can be increased by using films having greater elasticity. A completely elastic film, rubber for example, will form an approximate sphere when inflated. This ratio can also be either increased or decrease by a variety of geometric techniques some of which are discussed below. The surprising fact, however, is that without resorting to complicated tethering involving stitching, stress concentrations, added pieces of reinforcing material, and manufacturing complexity, the airbag made from inelastic film automatically provides nearly the desired shape for driver airbags upon deployment (i.e., the roughly circular shape commonly associated with driver side airbags). Note that this airbag still has a less than optimum stress distribution which will be addressed below.

Figure 3A:
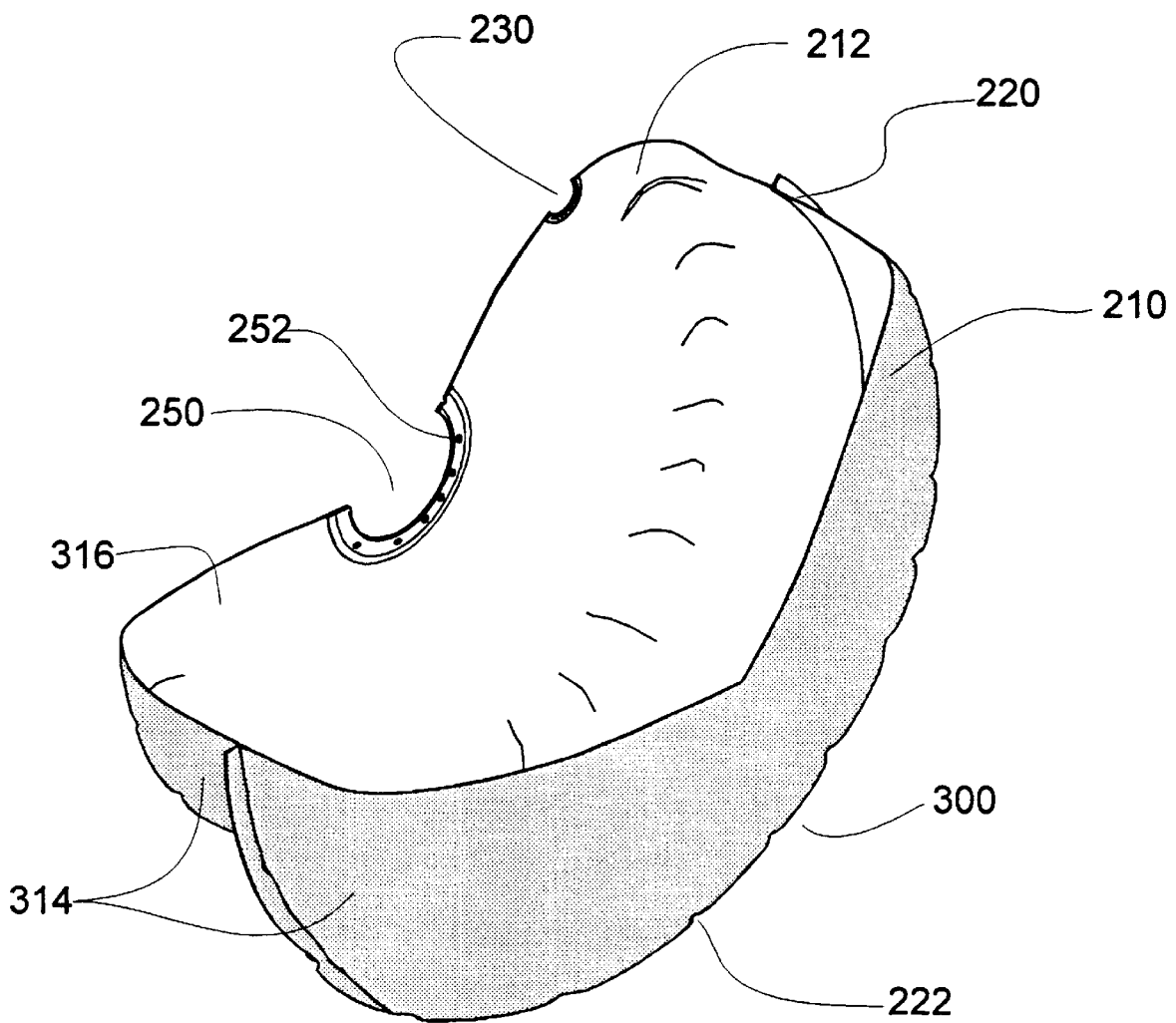
FIG. 3A is a partial cutaway perspective view of an inflated driver side airbag made from plastic film and a fabric to produce a hybrid airbag.

Although there are many advantages in making the airbag entirely from film, there is unfortunately reluctance on the part of the automobile manufacturers to make such a change in airbag design until the reliability of film airbags can be satisfactorily demonstrated. To bridge this gap, an interim design using a lamination of film and fabric is desirable. Such a design is illustrated in FIG. 3A which is a partial cutaway perspective view of a driver side airbag made from film 316 laminated with fabric 314 to produce a hybrid airbag 300. The remaining reference numbers represent similar parts as in FIG. 2. In all other aspects, the hybrid airbag acts as a film airbag. The inelastic nature of the film 316 causes this hybrid airbag 300 to form the proper shape for a driver airbag. The fabric 314, on the other hand, presents the appearance of a conventional airbag when viewed from the outside. Aside from the lamination process, the fabric 314 may be attached to the film 316 directly by suitable adhesives, such that there are only two material layers, or by heat sealing or any other convenient attachment and bonding method.

Figure 3B:
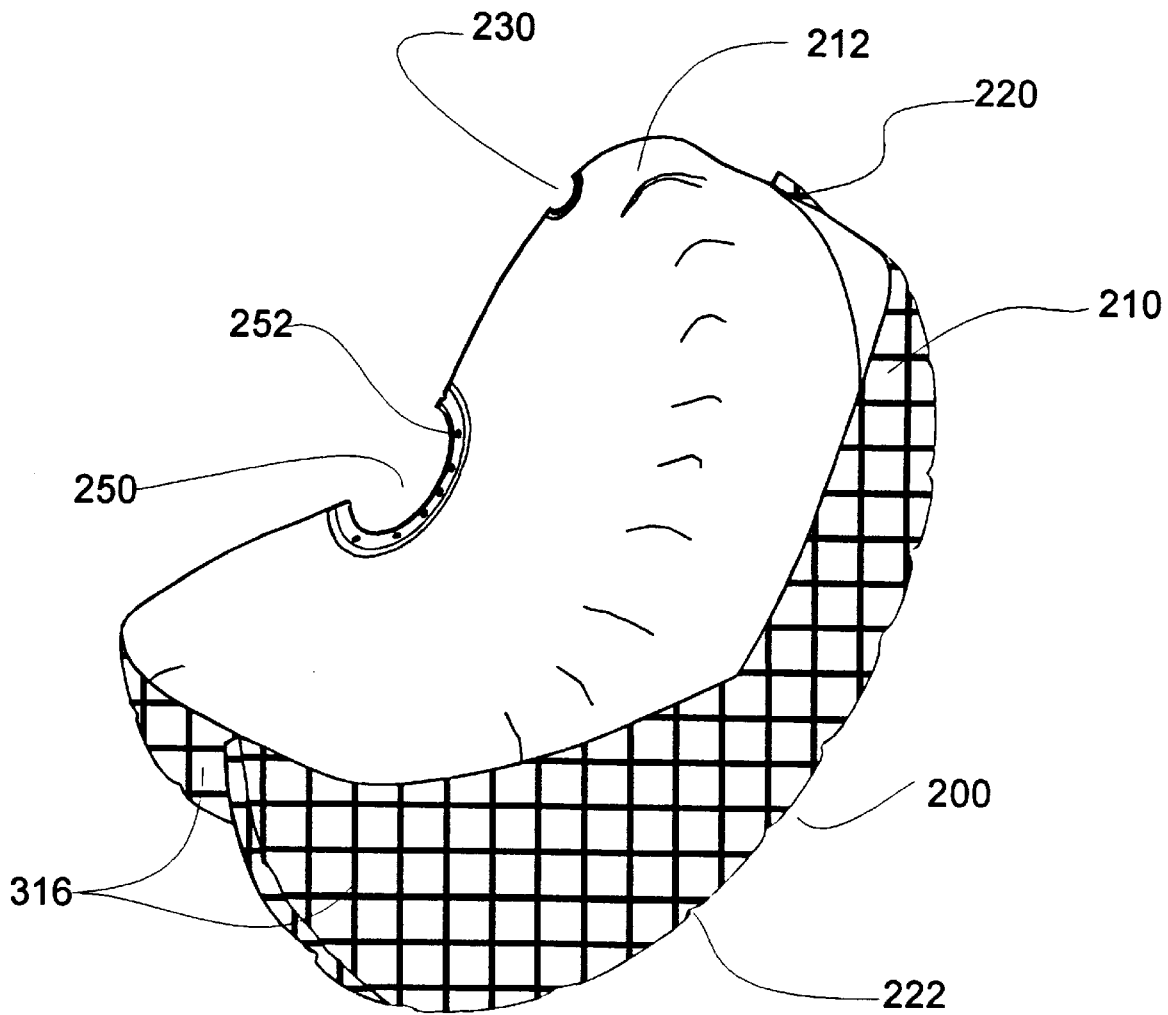
FIG. 3B is a partial cutaway perspective view of an inflated driver side airbag made from plastic film and a net to produce a hybrid airbag.

Analysis, as disclosed in the above referenced patent application Ser. No. 08/247,763, has shown that a net is much stronger per unit weight than a fabric for resisting tears. This is illustrated in FIG. 3B which is a partial cutaway perspective view of a driver side airbag 200 made from film 212 and a net 316, which is preferably laminated to the film or formed from the same material as the film and is integral with it, to produce a hybrid airbag. The analysis of this system is presented in the above-referenced patent application which is included herein by reference and therefore will not be reproduced here. The reference numerals designating the element in FIG. 3B correspond to the same elements as in FIG. 3A.

Figure 3C:
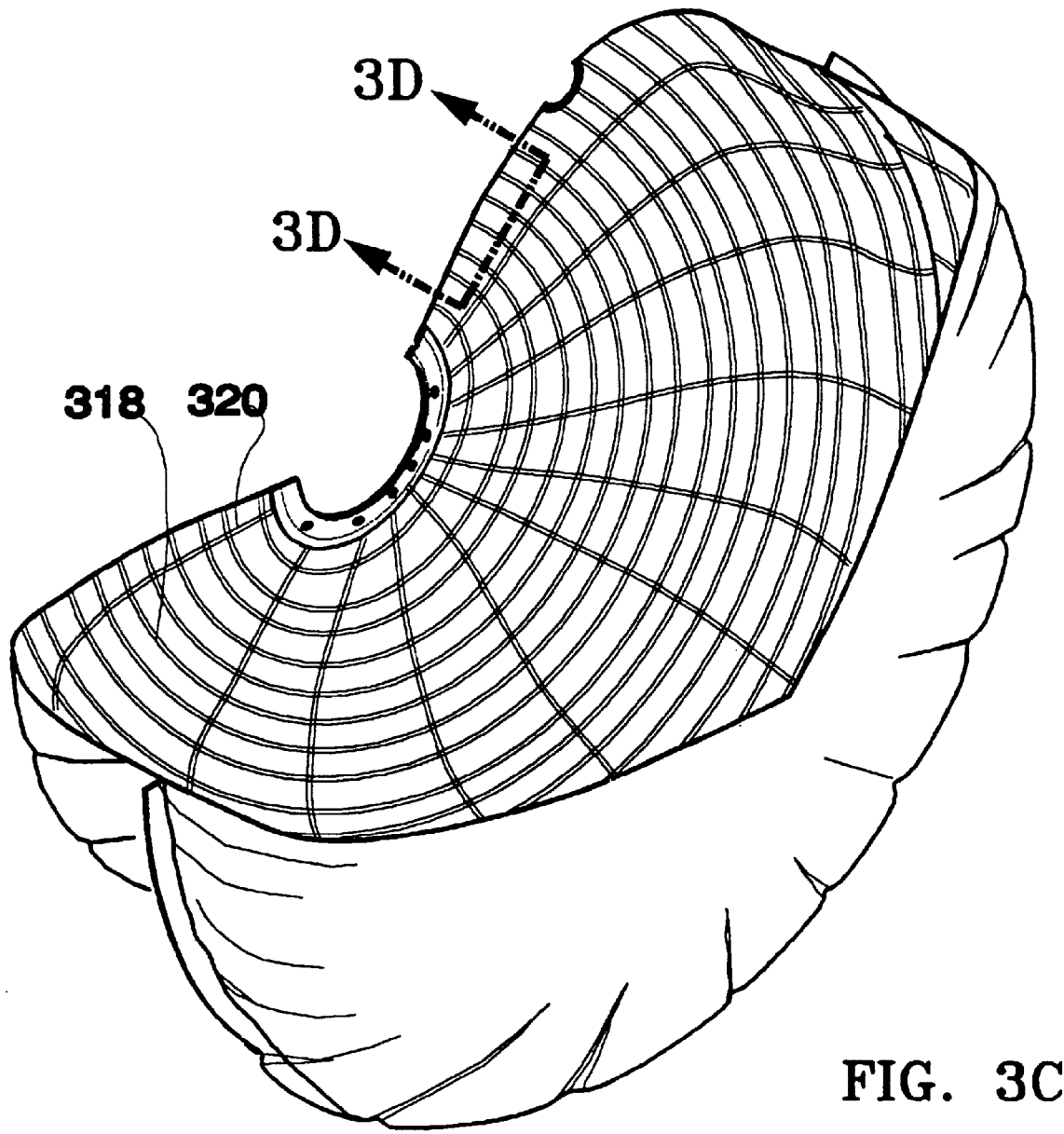
FIG. 3C is a partial cutaway perspective view of an inflated driver side airbag made from plastic film having a variable thickness reinforcement in a polar symmetric pattern with the pattern on the inside of the airbag leaving a smooth exterior.
Figure 3D:
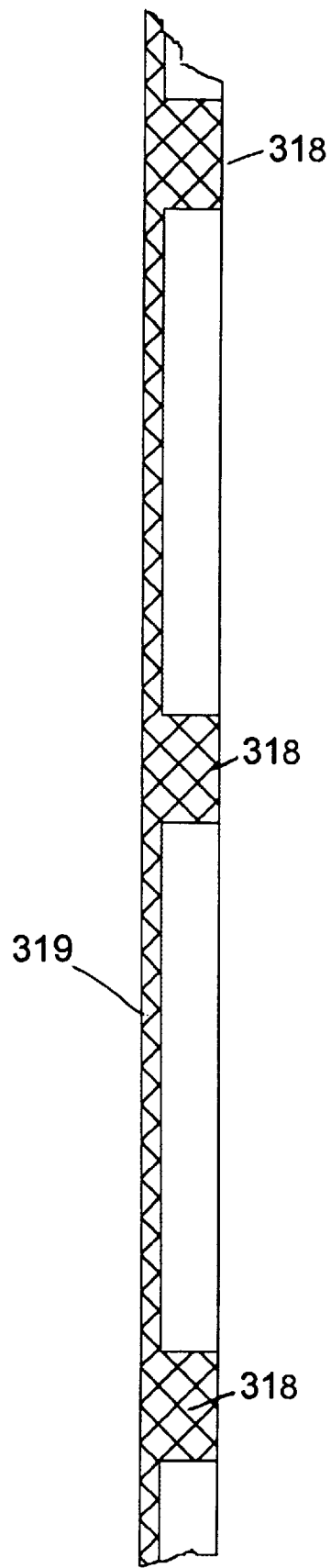
FIG. 3D is an enlarged cross sectional view of the material of the film airbag taken at 3D—3D of FIG. 3C showing the thickness variation within the film material.

For axisymmetric airbag designs such as shown in FIGS. 3A–3D, a more efficient reinforcement geometry is to place the reinforcements in a pattern of circular rings 318 and ribs 320 (FIG. 3C). A cross-sectional view of the material taken along line 3D—3D in FIG. 3C is shown in FIG. 3D. In this case, the reinforcement has been made by a progressive coating process from a thermoplastic elastomeric material such a polyurethane. In this case, the reinforcing rings and ribs 318,320 are many times thicker than the spanning thin film portions 319 and the reinforcing ribs 320 have a variable spacing from complete contact at the center or polar region to several centimeters at the equator. The reinforcements may comprise the laminated net as discussed above. Since the rings and ribs 318,320 are formed in connection with the inner surface of the airbag 200, the outer surface of the airbag 200 maintains its generally smooth surface.

In this regard, it should be stated that plastic manufacturing equipment exists today which is capable of performing this progressive coating process, i.e., forming a multi-layer plastic sheet (also referred to as a material sheet) from a plurality of different plastic layers. One such method is to provide a mold having the inverse form of the predetermined pattern and apply the specific plastic materials in individual layers into the mold, all but the initial layer being applied onto a preexisting layer. The mold has depressions having a depth deeper than a remaining portions of the mold which will constitute the thicker regions, the thinner portions of the mold constituting the spanning regions between the thicker regions. Also, it is possible and desirable to apply a larger amount of the thermoplastic elastomer in the depressions in the mold so that the thicker regions will provide a reinforcement effect. In certain situations, it is foreseeable that only the thermoplastic elastomer can be coated into the depressions whereas a plastic material which will form an inelastic film layer is coated onto the spanning regions between the depressions as well as in the depressions in order to obtain an integral bond to the thermoplastic elastomer. The mold can have the form of the polar symmetric pattern shown in FIG. 3C.

Figure 4A:
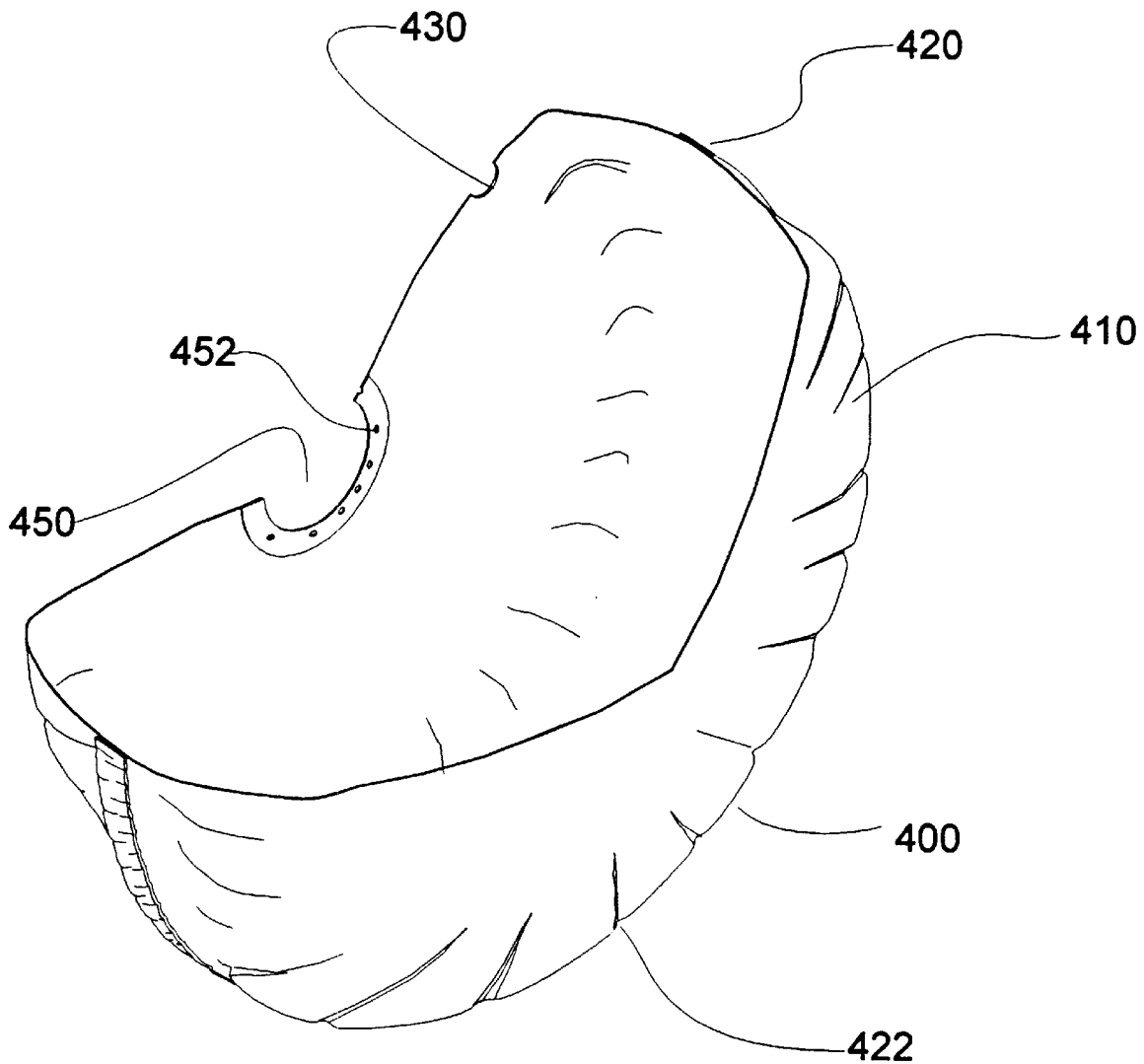
FIG. 4A is a partial cutaway perspective view of an inflated driver side airbag made from plastic film using a blow molding process.

The film airbag designs illustrated thus far were constructed from flat plastic sheets which have been sealed by heat welding, adhesive, or otherwise. An alternate method to fabricate an airbag is to use a molding process to form an airbag 400 as illustrated in FIG. 4A which is a partial cutaway perspective view of a driver side airbag made from film using blow molding (a known manufacturing process). Blow molding permits some thickness variation to be designed into the product, as does casting and progressive coating methods molding (other known manufacturing processes). In particular, a thicker annular zone 420 is provided on the circumference of the airbag 400 to give additional rigidity to the airbag in this area. Additionally, the material surrounding the inflator attachment hole 450 has been made thicker removing the necessity for a separate reinforcement ring of material. Holes 452 are again provided, usually through a secondary operation, for attachment of the airbag 400 to the inflator.

The vent hole 430 is formed by a secondary process and reinforced, or, alternately, provision is made in the inflator for the gases to exhaust therethrough, thereby removing the need for the hole 430 in the bag material itself. Since this design has not been stress optimized, the customary wrinkles and folds 422 also appear.

Figure 4B:
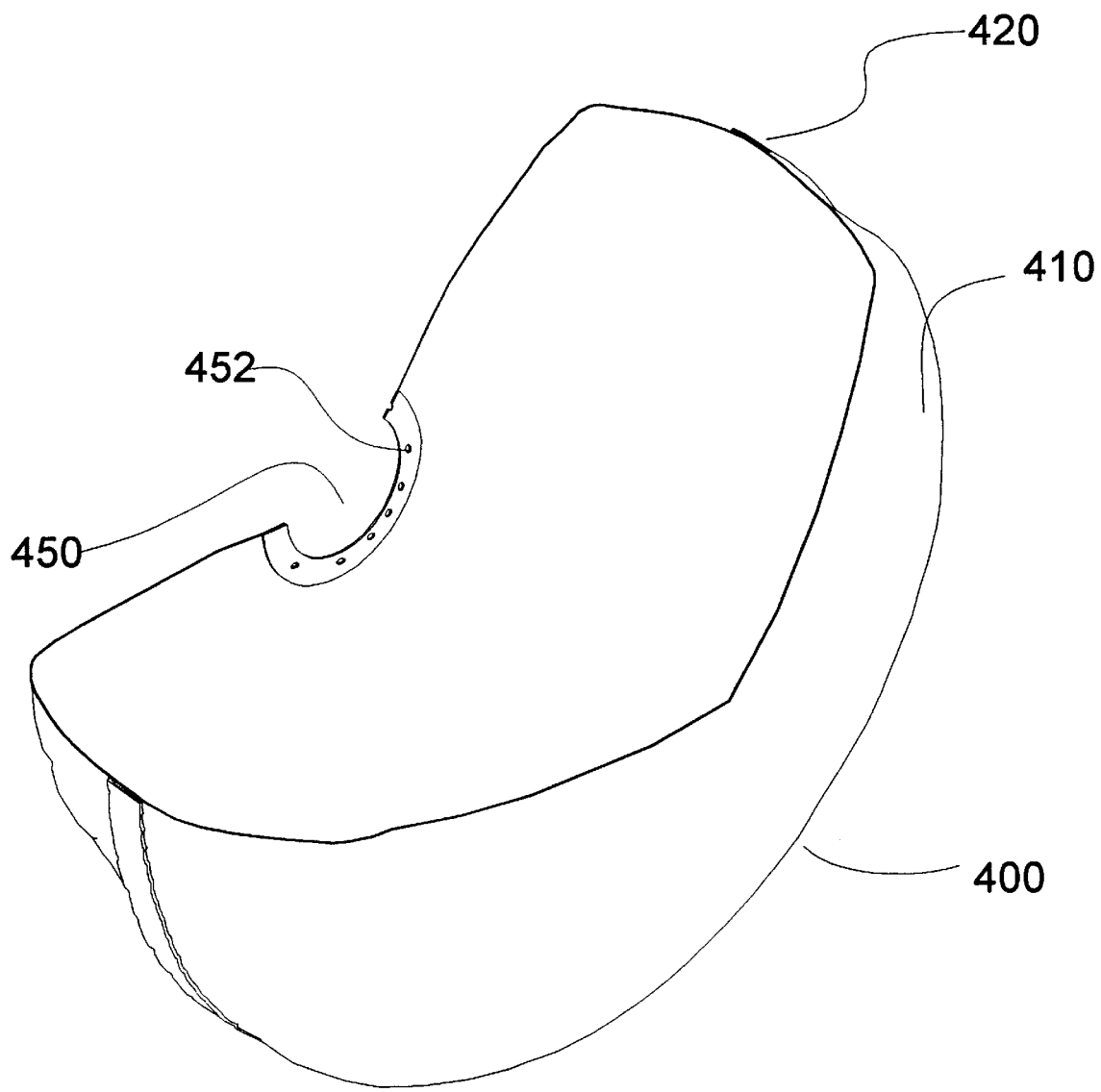
FIG. 4B is a partial cutaway perspective view of an inflated driver side airbag made from plastic film using a blow molding process so that the airbag design has been partially optimized using finite element airbag model where the wrinkles have been eliminated and where the stresses within the film are more uniform.

One advantage of the use of the blow molding process to manufacture airbags is that the airbag need not be made from flat sheets. Through careful analysis, using a finite element program for example, the airbag can be designed to substantially eliminate the wrinkles and folds seen in the earlier implementations. Such a design is illustrated in FIG. 4B which is a partial cutaway perspective view of a driver side airbag made from film using a blow molding process where the airbag design has been partially optimized using a finite element airbag model. This design has a further advantage in that the stresses in the material are now more uniform permitting the airbag to be manufactured from thinner material.

Figure 4C:
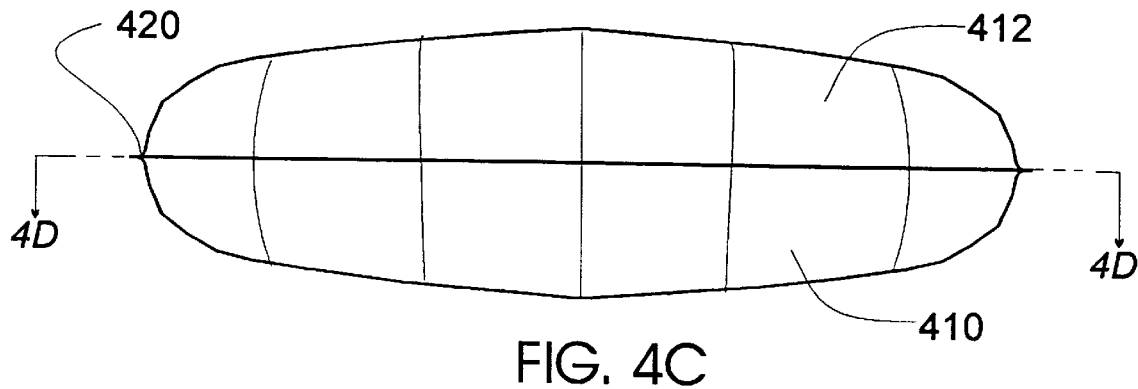
FIG. 4C is a cutaway view of an inflated driver side airbag made from plastic film showing a method of decreasing the ratio of thickness to effective diameter.
Figure 4D:
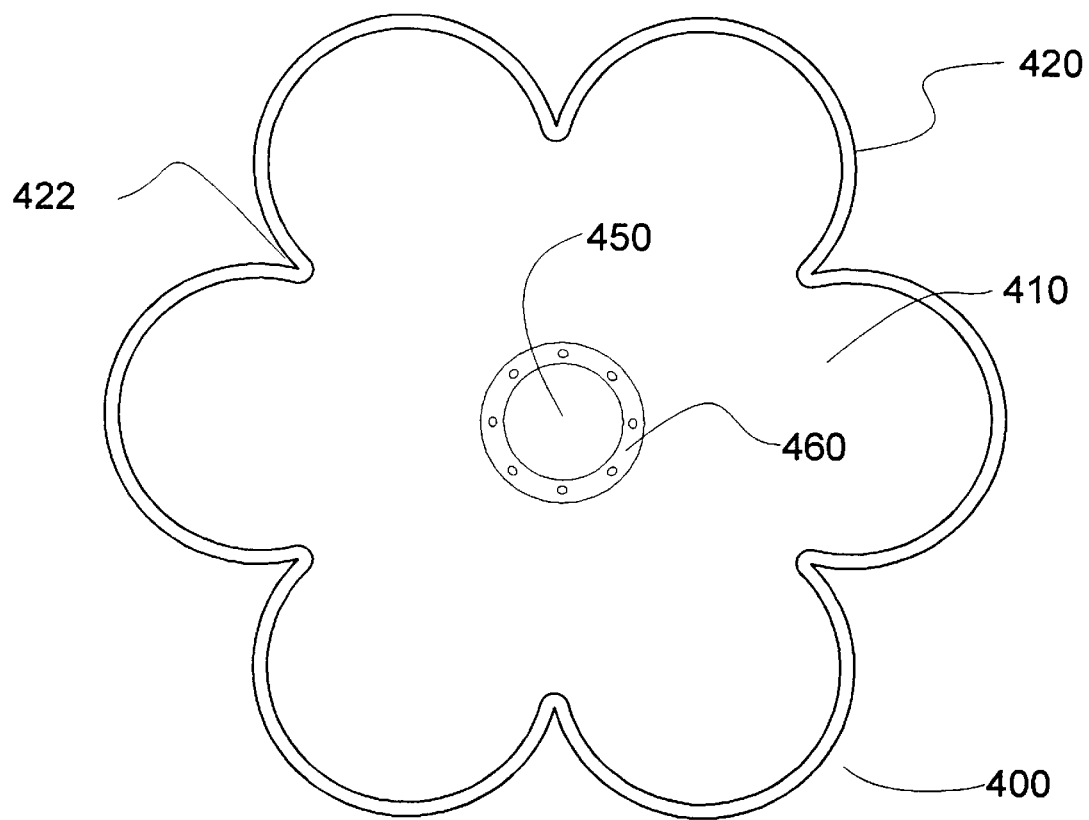
FIG. 4D is a view of a driver side airbag of FIG. 4C as viewed along line 4D—4D.

In some vehicles, and where the decision has been made not to impact the driver with the airbag (for example if a hybrid airbag is used), the inflated airbag comes too close to the driver if the ratio of thickness to diameter is 0.6. In these applications, it is necessary to decrease this ratio to 0.5 or less. For this ratio, thickness means the dimension of the inflated airbag measured coaxial with the steering column, assuming the airbag is mounted in connection with the steering column, and diameter, or average or effective diameter, is the average diameter measured in a plane perpendicular to the thickness. This ratio can be obtained without resorting to tethers in the design as illustrated in FIG. 4C which is a side view of a driver side airbag made from film where the ratio of thickness to effective diameter decreases. FIG. 4D is a view of the airbag of FIG. 4C taken along line 4D—4D. This airbag 400 is manufactured from two sheets of material 410 and 412 which are joined together by sealing means to form seal 420. Inflator attachment hole 450 is reinforced with a ring of plastic material 460 as described above. Many circumferential geometries can be used to accomplish this reduction in thickness to diameter ratio, or even to increase this ratio if desired. The case illustrated in FIG. 4C and FIG. 4D is one preferred example of the use of a finite element design method for an airbag.

Figure 5:
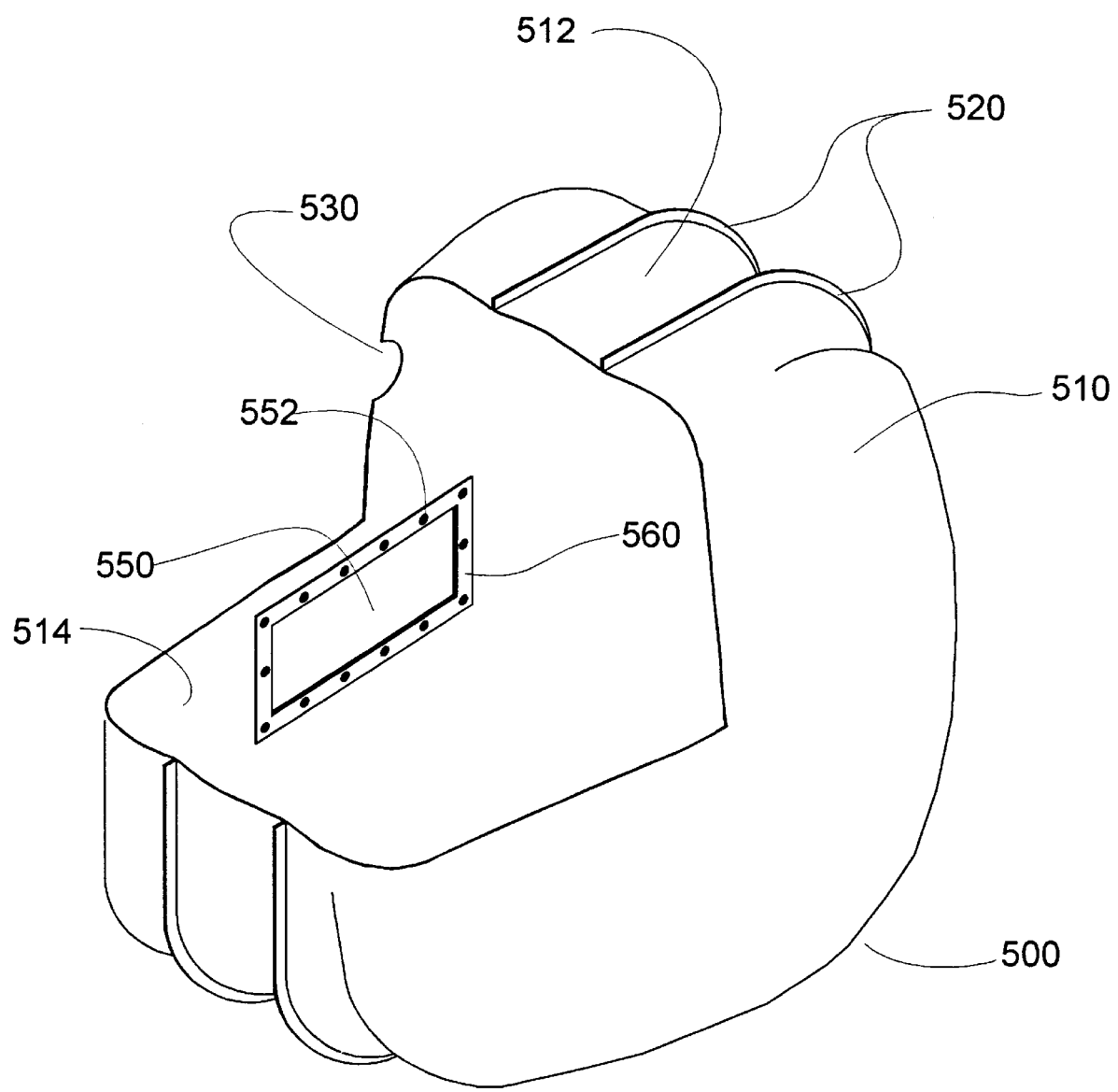
FIG. 5 is a partial cutaway perspective view of a passenger side airbag made from plastic film.

The discussion above has been limited for the most part to the driver side airbag which is attached to the vehicle steering wheel or otherwise arranged in connection therewith. This technology is also applicable to a passenger side airbag, which is generally attached to the instrument panel, as illustrated in FIG. 5 which is a partial cutaway perspective view of a passenger side airbag 500 made from three pieces of flat film 510, 512 and 514 which have joined seams 520 between adjacent pieces of film 510, 512, 514. The passenger side airbag, as well as rear seat airbags and side impact airbags, generally have a different shape than the driver side airbag but the same inventive aspects described above with respect to the driver side airbag could also be used in connection with passenger side airbags, rear seat airbags and side impact airbags. Although illustrated as being constructed from a plurality of sheets of plastic film, this airbag can also be made by blow molding or other similar molding process, i.e., as one unitary sheet. Also, for many vehicles, the sheet 512 is unnecessary and will not be used thereby permitting the airbag to once again be manufactured from only two flat sheets. The inflator attachment hole 550 is now typically rectangular in shape and is reinforced by a rectangular reinforcement plastic ring 560 having inflator-mounting holes 552. A vent hole 530 is also provided to vent gases from the deploying airbag 500.

Figure 6:
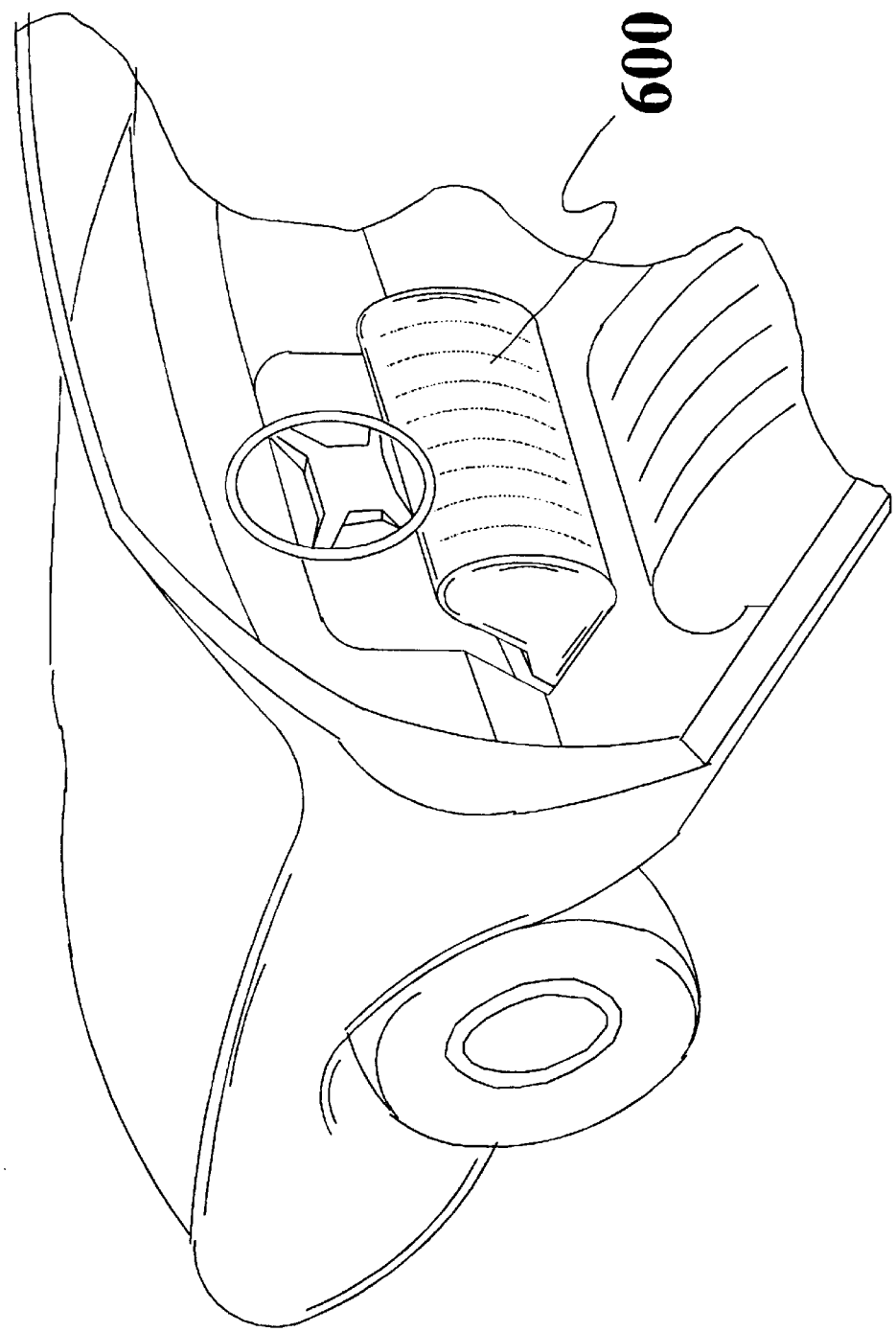
FIG. 6 is a perspective view with portions cut away of a vehicle showing the knee bolster airbag in an inflated condition mounted to provide protection for a driver.

In FIG. 6, a knee protection airbag for the front driver is shown generally at 600. Since the airbag fills the entire space between the knee and the instrument panel and since the instrument panel is now located at a substantial distance from the occupant's knees, there is substantially more deflection or stroke provided for absorbing the energy of the occupant. Since the distance of deployment of the knee airbag can be designed large enough to be limited only by the interaction with an occupant or some other object, the knee airbag can be designed so that it will inflate until it fills the void below the upper airbag, not illustrated in this figure. The knee protection airbag 600 can take the form of any of the composite airbag disclosed above, e.g., include a plastic film layer and an overlying net, or two or more plastic film layers, at least one inelastic to provide the shape of the knee bolster and at least one elastic to control the propagation of a tear.

Figure 13:
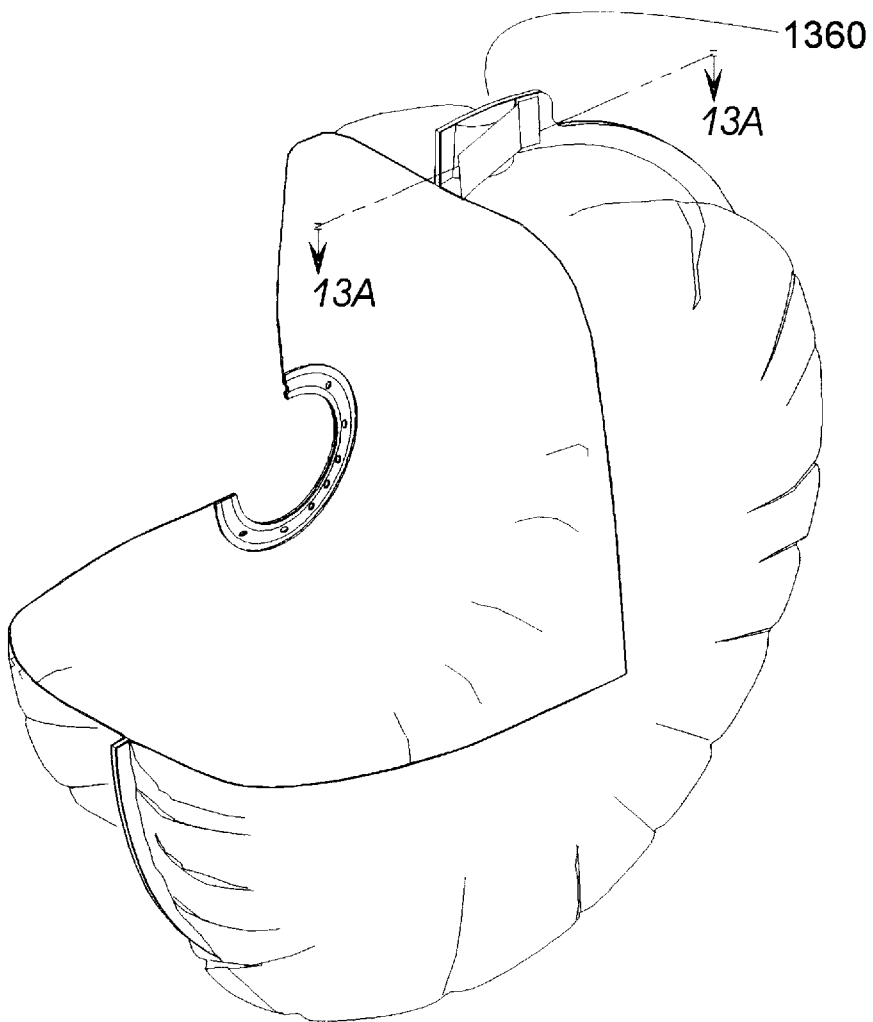
FIG. 13 is a partial cutaway perspective view of a driver side airbag made from plastic film having a variable vent in the seam of the airbag.
Figure 13A:
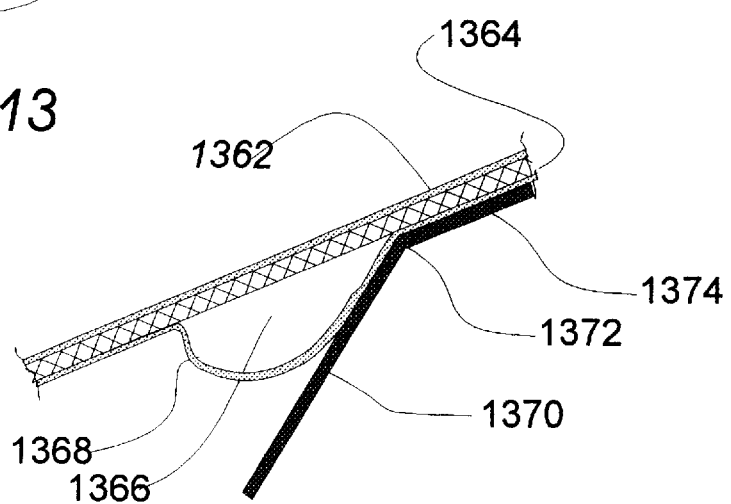
FIG. 13A is an enlargement of the variable vent of FIG. 13 taken along line 13A—13A of FIG. 13.

As an alternate to providing a fixed vent hole as illustrated in the previous examples, a variable vent hole can be provided as shown in FIGS. 13 and 13A (discussed below). Alternately this variable vent function can be incorporated within the inflator as illustrated in copending U.S. patent application Ser. No. 08/571,247 filed Dec. 12, 1995.

In a conventional airbag module, when the inflator is initiated, gas pressure begins to rise in the airbag which begins to press on the deployment door. When sufficient force is present, the door breaks open along certain well-defined weakened seams permitting the airbag to emerge from its compartment. The pressure in the airbag when the door opens, about 10 to 20 psi, is appropriate for propelling the airbag outward toward the occupant, the velocity of which is limited by the mass of the airbag. In the case of a film airbag, this mass is substantially less, perhaps by as much as a factor of ten, causing it to deploy at a much higher velocity if subjected to these high pressures. This will place unnecessary stresses in the material and the rapid movement of the airbag past the deployment door could induce abrasion and tearing of the film by the deployment door. A film airbag, therefore, must be deployed at a substantially lower pressure. However, conventional deployment doors require this higher pressure to open. This problem is discussed in detail in the above referenced co-pending patent applications where, in one implementation, a pyrotechnic system is used to cut open the door according to the teachings of the Barnes et al. patent (U.S. Pat. No. 5,390,950).

Figure 7:
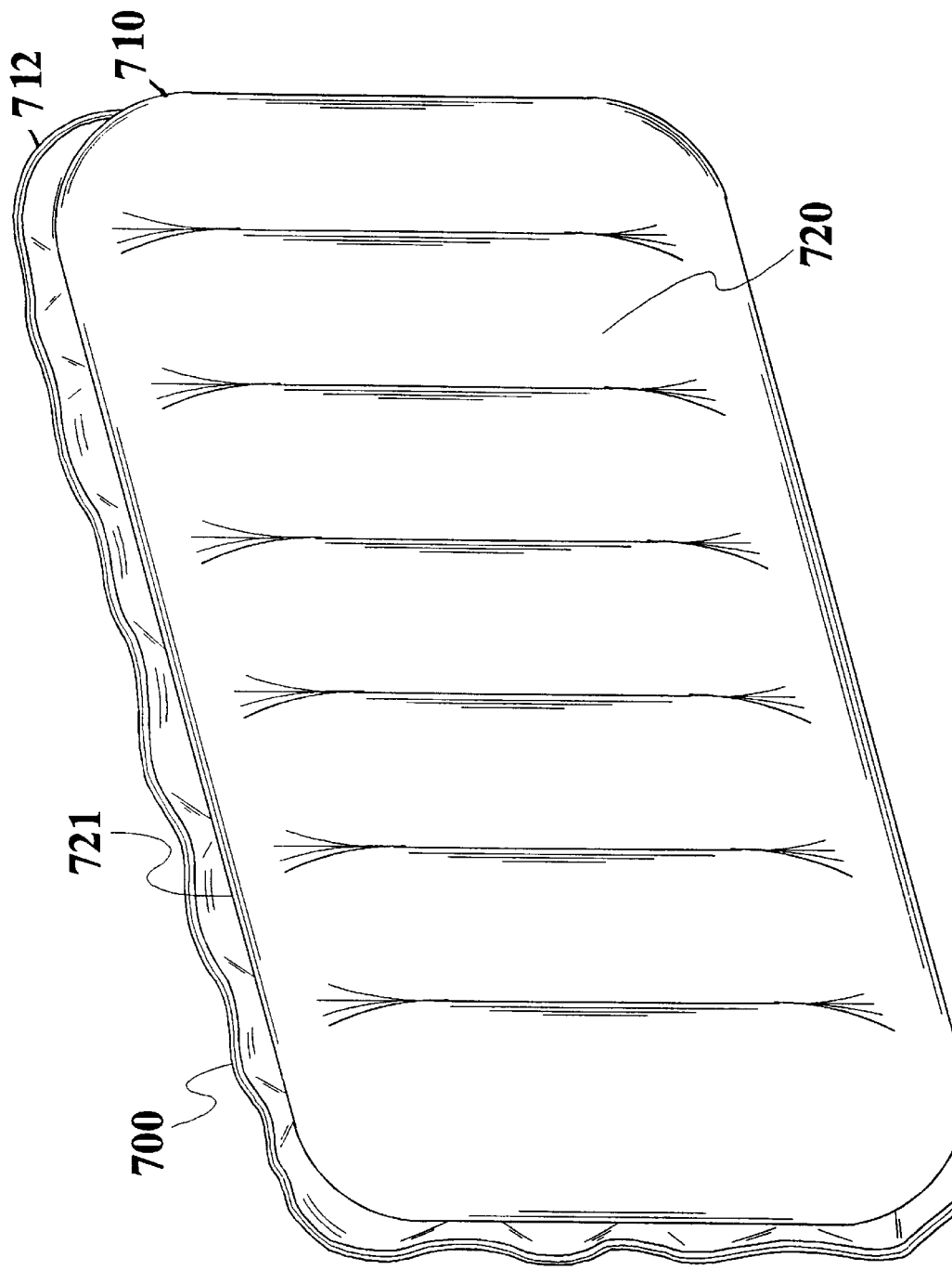
FIG. 7 is a perspective view of an airbag and inflator system where the airbag is formed from tubes.

One method of forming a film airbag is illustrated generally at 700 in FIG. 7. In this implementation, the airbag is formed from two flat sheets of film material 710,712 which have been heat or adhesive sealed at joints 721 to form long tubular shaped mini-airbags in much the same way that an air mattress is formed. In FIG. 7, a single layer of mini-airbags 720 is shown. In other implementations, two or more layers would be used. Also, although a tubular pattern has been illustrated, other patterns are also possible such as concentric circles, waffle-shaped or one made from rectangles, or one made from a combination of these geometries or others. The film airbag 700 may be used as either a side airbag extending substantially along the entire side of the vehicle or as a rear seat airbag extending from one side of the vehicle to the other behind the front seat and may include any of the venting arrangements described herein.

Figure 8:
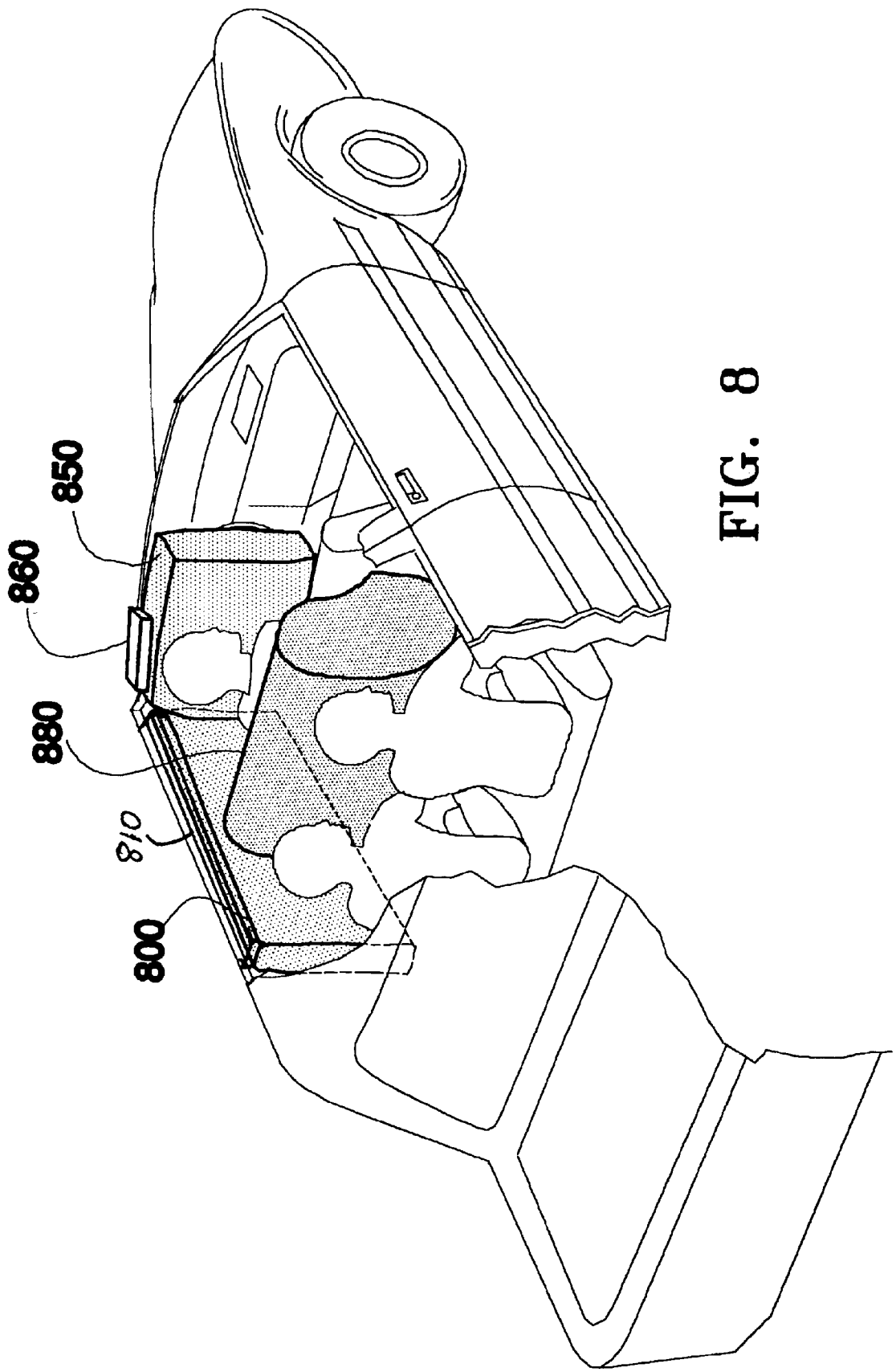
FIG. 8 is a perspective view with portions removed of a vehicle having several deployed film airbags.

FIG. 8 is a perspective view with portions removed of a vehicle having several deployed film airbags. Specifically, a single film airbag having several sections spans the left side of the vehicle and is deployed downward before being filled so that it fits between the front seat and the vehicle side upon inflation (an airbag spanning the right side of the vehicle can of course be provided). This provides substantial support for the airbag and helps prevent the occupant from being ejected from the vehicle even when the side window glass has broken. A system which also purports to prevent ejection is disclosed in Bark (U.S. Pat. Nos. 5,322,322 and 5,480,181). The Bark system uses a small diameter tubular airbag stretching diagonally across the door window. Such a device lacks the energy absorbing advantages of an airbag since it does not have an exhaust vent. In fact, the device can act as a spring and can cause the head of the occupant to rebound and actually experience a higher velocity change than that of the vehicle. This can cause severe neck injury in high velocity crashes. It also is designed to protect primarily the head of the occupant, offering little protection for the other body parts. In contrast to the completely sealed airbag of Bark, the film airbag of the present invention has energy absorbing vents and thus dampens the motion of the occupant's head and other body parts upon impact with the film airbag. It covers the entire vehicle opening and receives support from the vehicle structure. In contrast to the Bark tube, this support does not require complicated mounting apparatus going around the vehicle door and down the A-pillar but is only mounted to the ceiling above the side door. Also, by giving support to the entire body and adjusting the pressure between the body parts, the airbag of the present invention minimizes the force on the neck of the occupant and thus minimizes neck injuries.

In FIG. 8, the single side protection airbag for the driver side is illustrated at 800. A single front airbag spans the front seat for protection in frontal impacts and is illustrated at 850 with the ceiling mounted inflator at 860. A single airbag is also used for protection of each of the rear seat occupants in frontal impacts and is illustrated at 880. With respect to the positioning of the side airbag 800, the airbag 800 is contained within a housing 810 which is position entirely above the window of the side doors, i.e., no portion of it extends down the A-pillar or the B-pillar of the vehicle (as in Bark). The side airbag housing 810 thus includes mounting means (not shown) for mounting it above the window to the ceiling of the vehicle and such that it extends across both side doors (when present in a four-door vehicle) and thus protects the occupants sitting on that side of the vehicle from impacting against the windows in the side doors. To ensure adequate protection for the occupants from side impacts, as well as frontal impacts which would result in sideward movement of the occupants against the side doors, the airbag housing 810 is constructed so that the airbag 800 is initially projected in a downward direction from the ceiling prior to inflation and extends at least substantially along the entire side of the ceiling. This initial projection may be designed as a property of the module 810 which houses the airbag 800, e.g., by appropriate construction and design of the module and its components such as the dimensioning the module's deployment door and deployment mechanism. Although any type of airbag can be used as the side impact protection airbag, one preferred implementation is when the airbag comprises first and second attached non-perforated sheets of film and tear propagation arresting means arranged in connection with each of the film sheets for arresting the propagation of a tear therein. The airbag should include venting means (e.g., a venting aperture as shown in FIGS. 3A and 3B) arranged in connection with the airbag for venting the airbag after inflation thereof. In certain embodiments, the airbag is arranged to extend at least along a front portion of the ceiling such that the airbag upon inflation is interposed between a passenger in the front seat of the vehicle and the dashboard.

Figure 9:
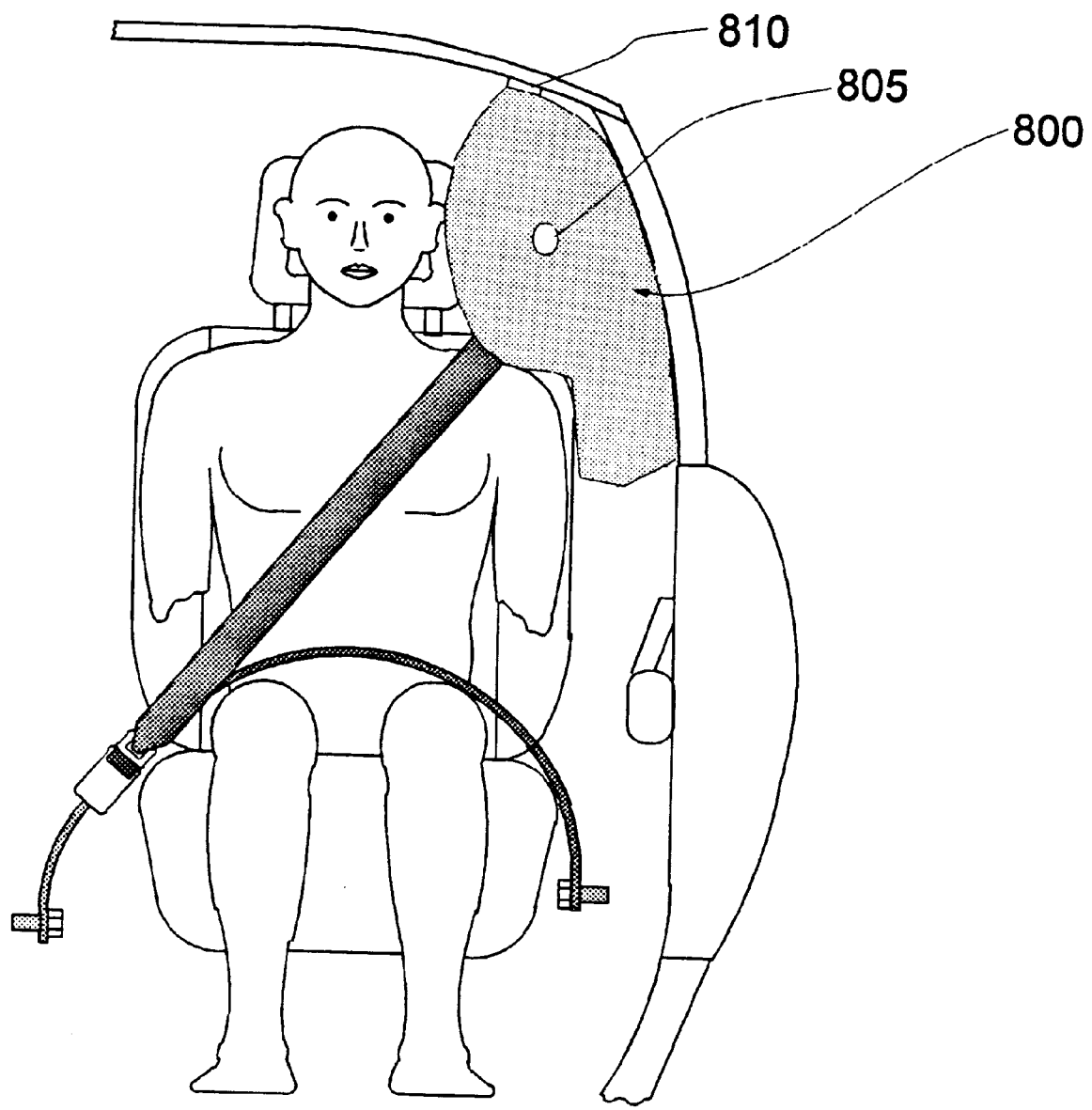
FIG. 9 is a view of another preferred embodiment of the invention shown mounted in a manner to provide protection for a front and a rear seat occupant in side impact collisions and to provide protection against impacts to the roof support pillars in angular frontal impacts.

FIG. 9 is a view looking toward the rear of the vehicle of the deployed side protection airbag of FIG. 8 where like numbers represent the same parts in both drawings. Here the airbag vent is illustrated as a fixed opening 805. Naturally, other ventings are possible including venting through the airbag inflator as disclosed in the above referenced copending patent applications as well as the variable vent described below with reference to FIGS. 13 and 13A.

Figure 9A:
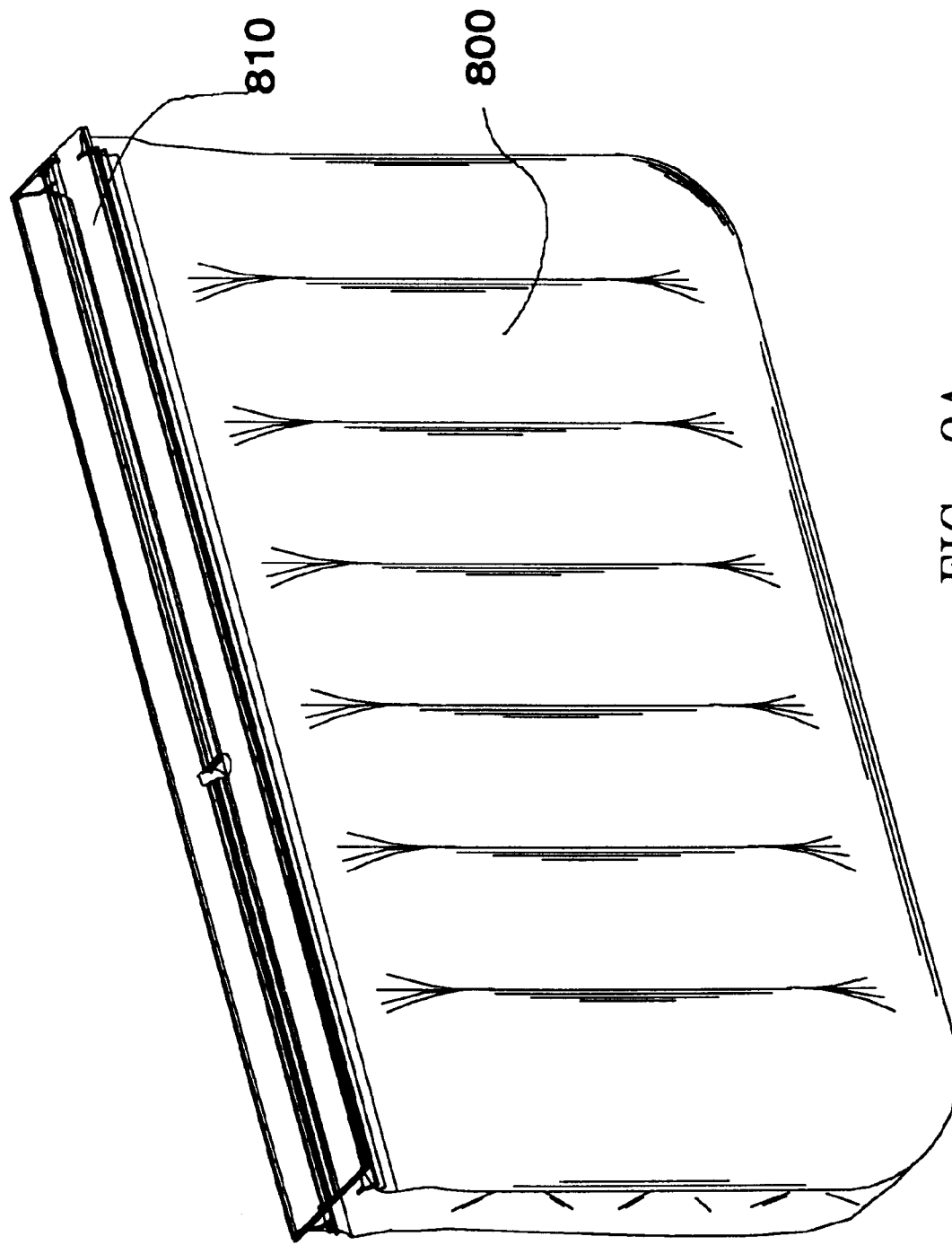
FIG. 9A is a view of the side airbag of FIG. 9 of the side airbag with the airbag removed from the vehicle.

FIG. 9A is a view of the side airbag of FIG. 9 with the airbag removed from the vehicle where again like numbers represent like parts.

FIGS. 10, 11 and 11A–11D illustrate the teachings of this invention applied in a manner similar to the airbag system of Ohm in U.S. Pat. No. 5,322,326. The airbag of the Ohm patent is a small limited protection system designed for the aftermarket. It uses a small compressed gas inflator and an unvented thin airbag which prevents the occupant from contacting with the steering wheel but acts as a spring causing the occupants head to rebound from the airbag with a high velocity. The system of FIG. 10 improves the performance of and greatly simplifies the Ohm design by incorporating the sensor and compressed gas inflator into the same mounting assembly which contains the airbag. The system is illustrated generally at 900 in FIG. 10 where the mounting of the system in the vehicle is similar to that of Ohm.

Figure 10:
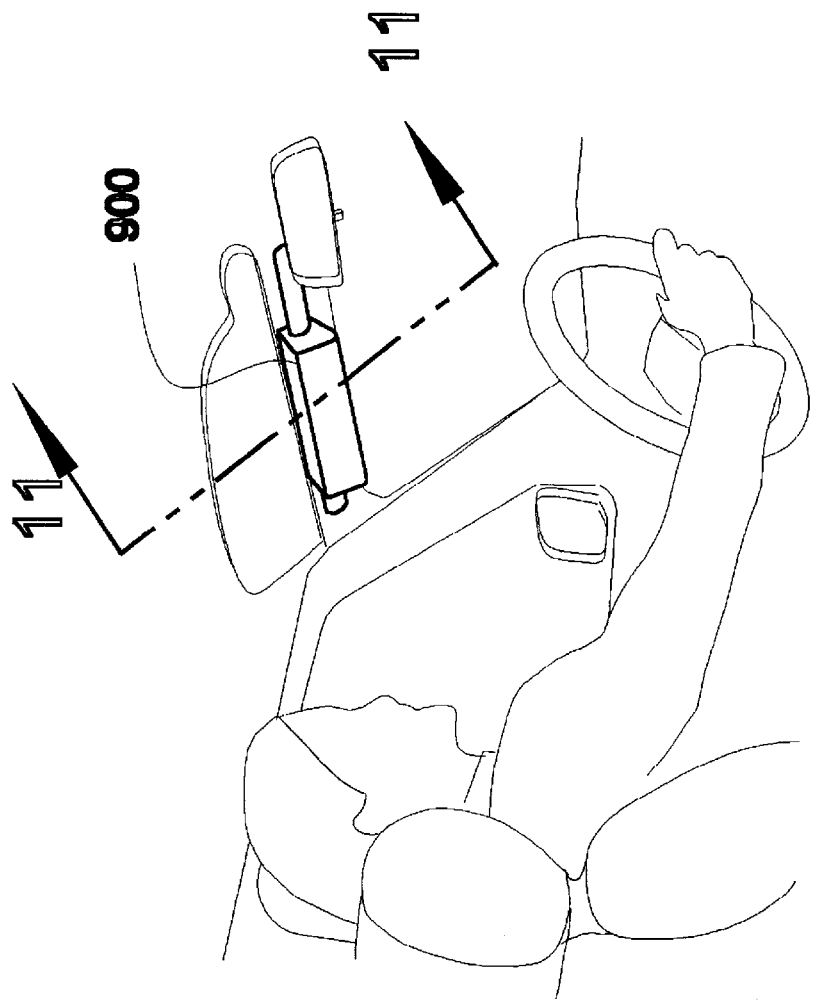
FIG. 10 is a partial view of the interior driver area of a vehicle showing a self-contained airbag module containing the film airbag of this invention in combination with a stored gas inflator.
Figure 11:
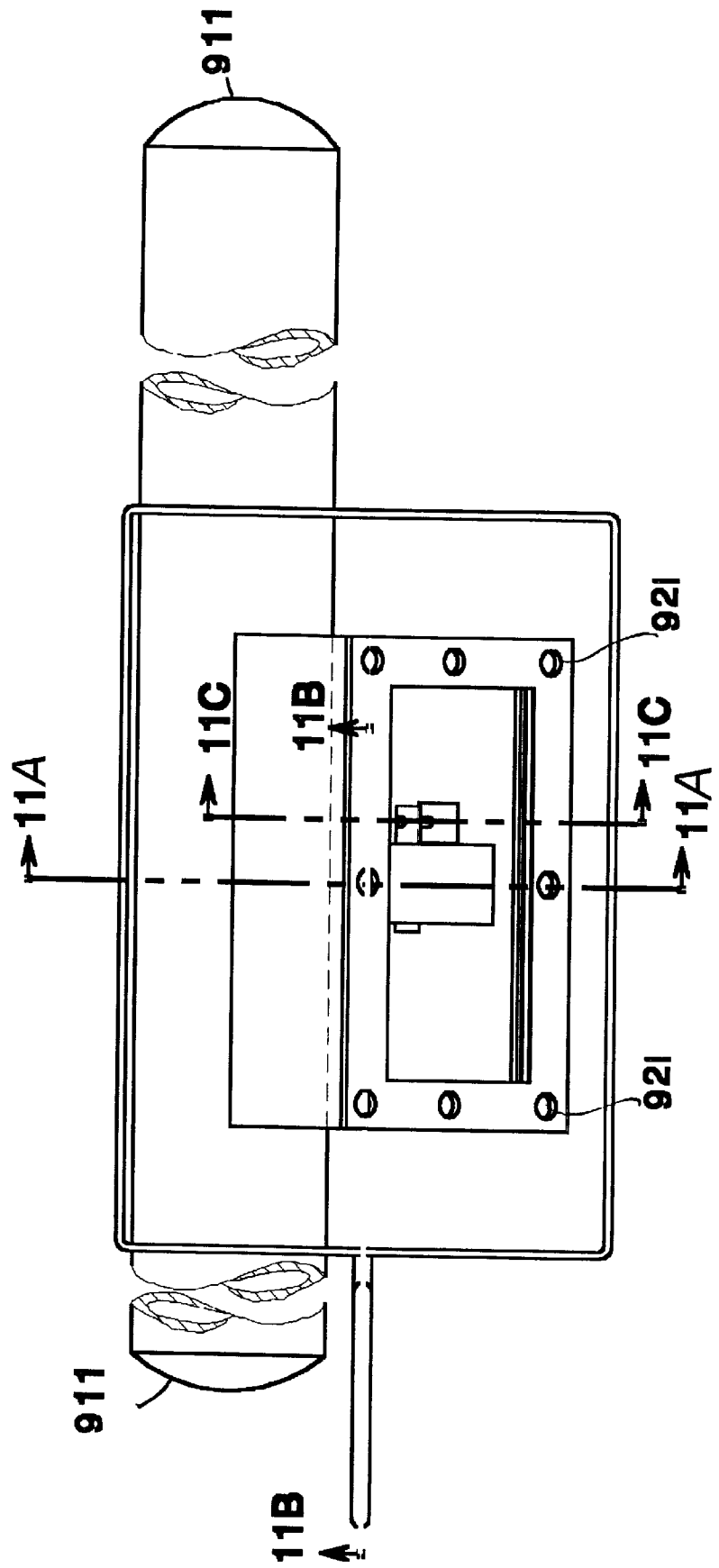
FIG. 11 is a view looking toward the rear of the airbag module of FIG. 10 with the vehicle removed taken at 11—11 of FIG. 10.

In FIG. 11 the module assembly is illustrated from a view looking toward the rear of the airbag module of FIG. 10 with the vehicle removed, taken at 11—11 of FIG. 10. The module 900 incorporates a mounting plate 901, a high pressure small diameter tube constituting an inflator 910 and containing endcaps 911 which are illustrated here as having a partial spherical surface but may also be made from flat circular plates. The mounting plate 901 is attached to the vehicle using screws, not illustrated, through mounting holes 921. An arming pin 985 is illustrated and is used as described below.

Figure 11A:
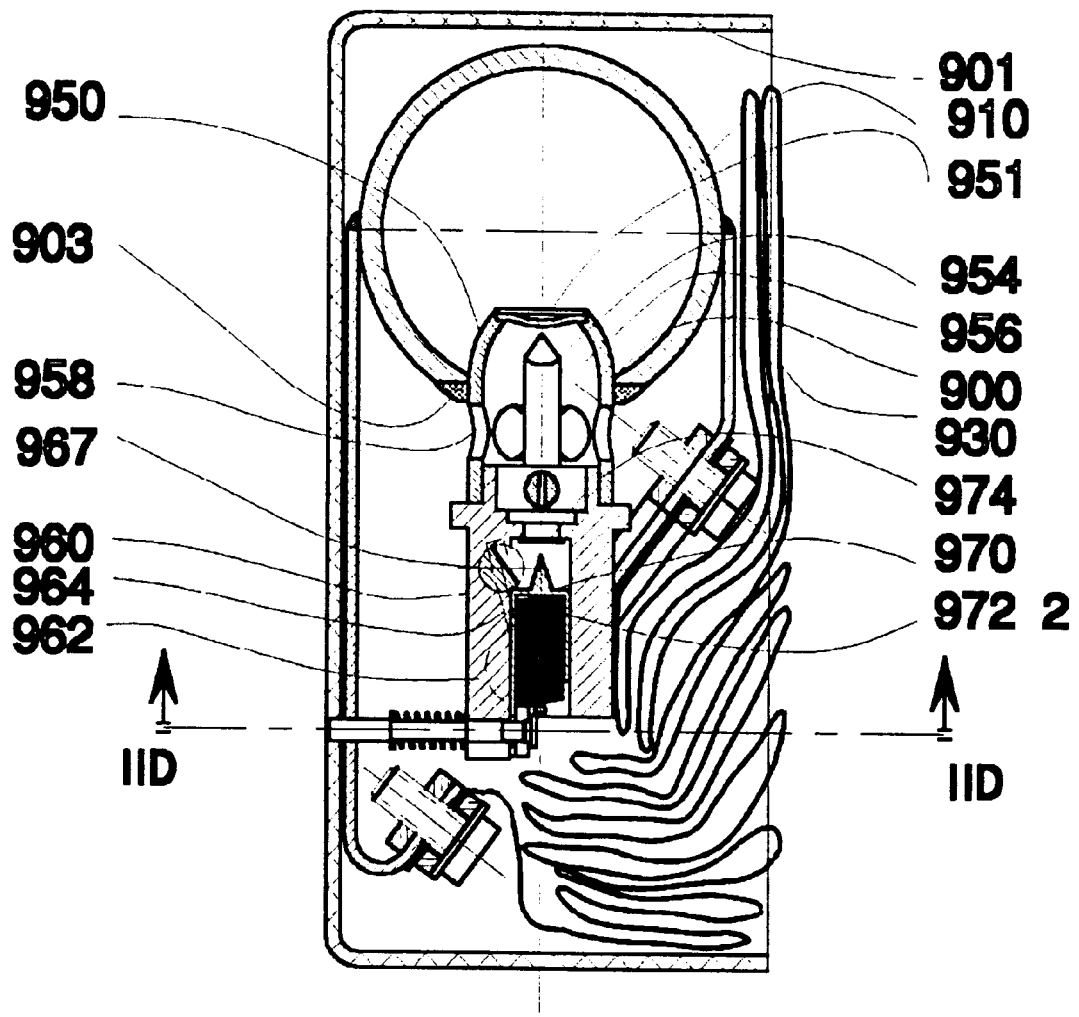
FIG. 11A is a cross sectional view of the airbag module of FIG. 11 taken at 11A—11A.

FIG. 11A is a cross section view of the airbag module of FIG. 11 taken at 11A—11A and illustrates the inflator initiation system of this invention. The inflator 910 is illustrated as a cylindrical tube, although other cross section shapes can be used, which contains a hole 900 therein into which is welded by weld 903 an initiation assembly 950. This assembly 950 has a rupture disk 951 welded into one end which will now be described in more detail. A rupture pin 954 is positioned adjacent rupture disk 951 which will be propelled to impact the rupture disk in the event of an accident as described below. When disk 951 is impacted by pin 954 it fails opening essentially all of the orifice covered by disk 951 permitting the high pressure gas which is in inflator tube 910 to flow out of the tube into cavity 956 of initiator assembly 950 and then through holes 958 into cavity 960. Cavity 960 is sealed by the airbag 930 which now deploys due to the pressure from the gas in cavity 960.

When the vehicle experiences a crash of sufficient severity to require deployment of the airbag 930, sensing mass 962, shown in phantom, begins moving to the left in the drawing toward the front of the vehicle. Sensing mass 962 is attached to shaft 964 which in turn is attached to D-shaft 966. As mass 962 moves toward the front of the vehicle, D-shaft 966 is caused to rotate. Firing pin 970 is held and prevented from moving by edge 967 of D-shaft 966. However, when D-shaft 966 rotates sufficiently, edge 967 rotates out of the path of firing pin 970 which is then propelled by spring 972 causing the firing pin point 973 to impact with primer 974 causing primer 974 to produce high pressure gas which propels pin 954 to impact disk 951 releasing the gas from inflator tube 910 inflating the airbag as described above. This sensor, D-shaft and primer mechanism is similar to mechanisms disclosed in copending patent application Ser. No. 08/101,017, filed Sep. 16, 1993 which is included herein by reference and therefore will not be described in more detail here.

Figure 11B:
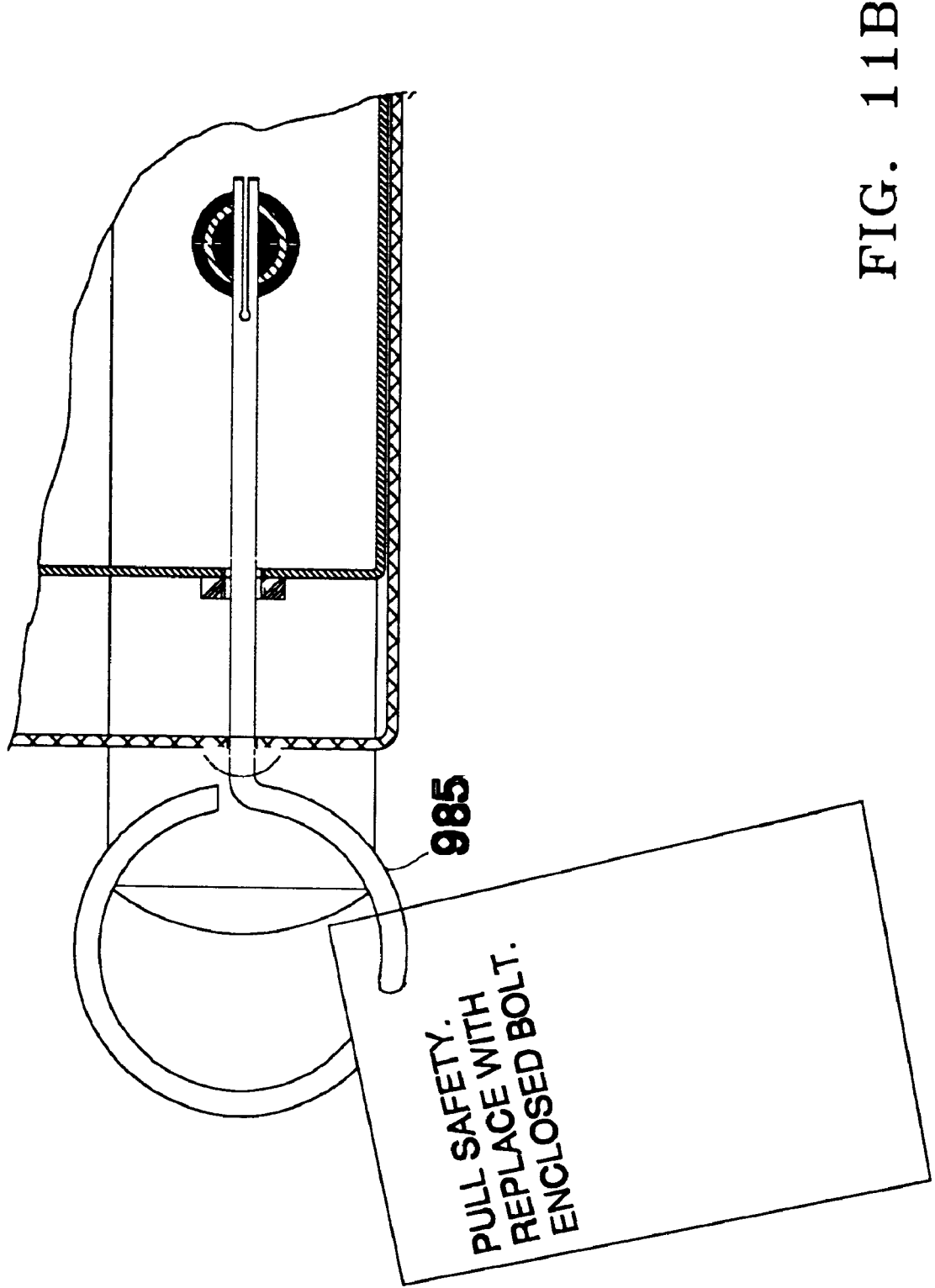
FIG. 11B is a cross sectional view, with portions cutaway and removed, of the airbag module of FIG. 11 taken at 11B—11B.
Figure 11C:
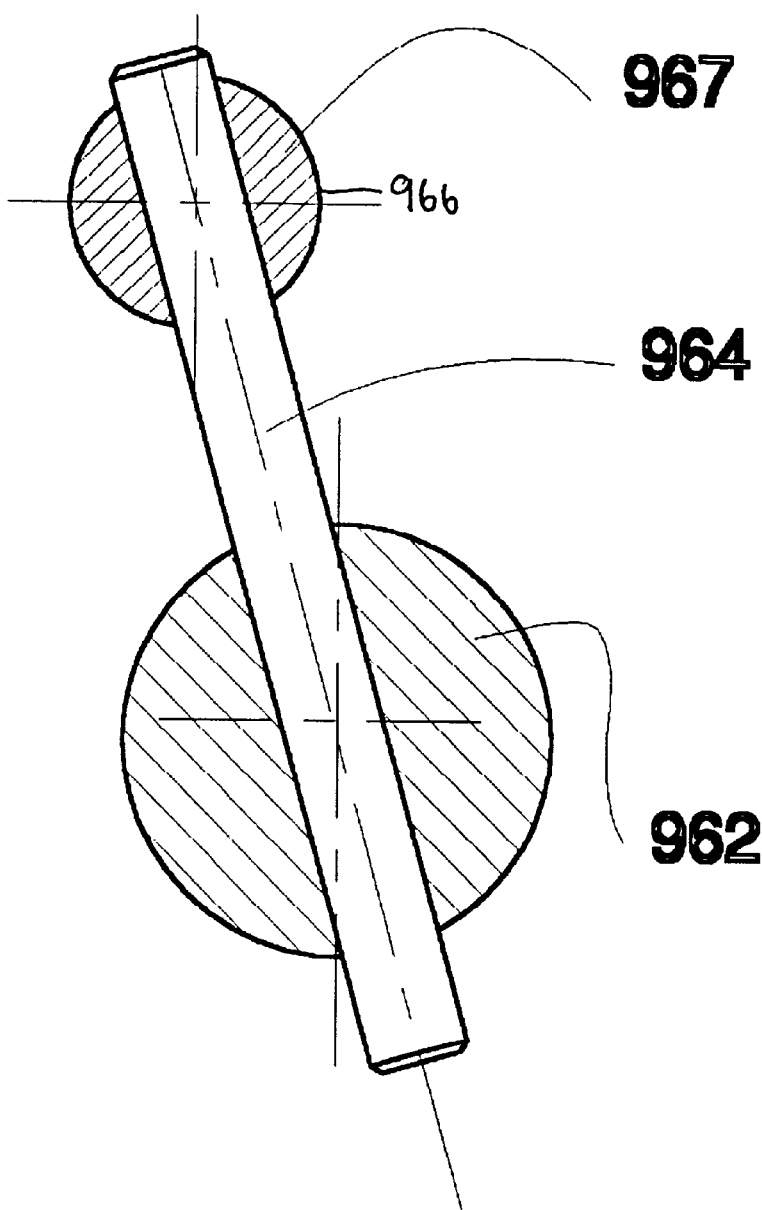
FIG. 11C is a cross sectional view of the airbag module of FIG. 11 taken at 11C—11C.
Figure 11D:
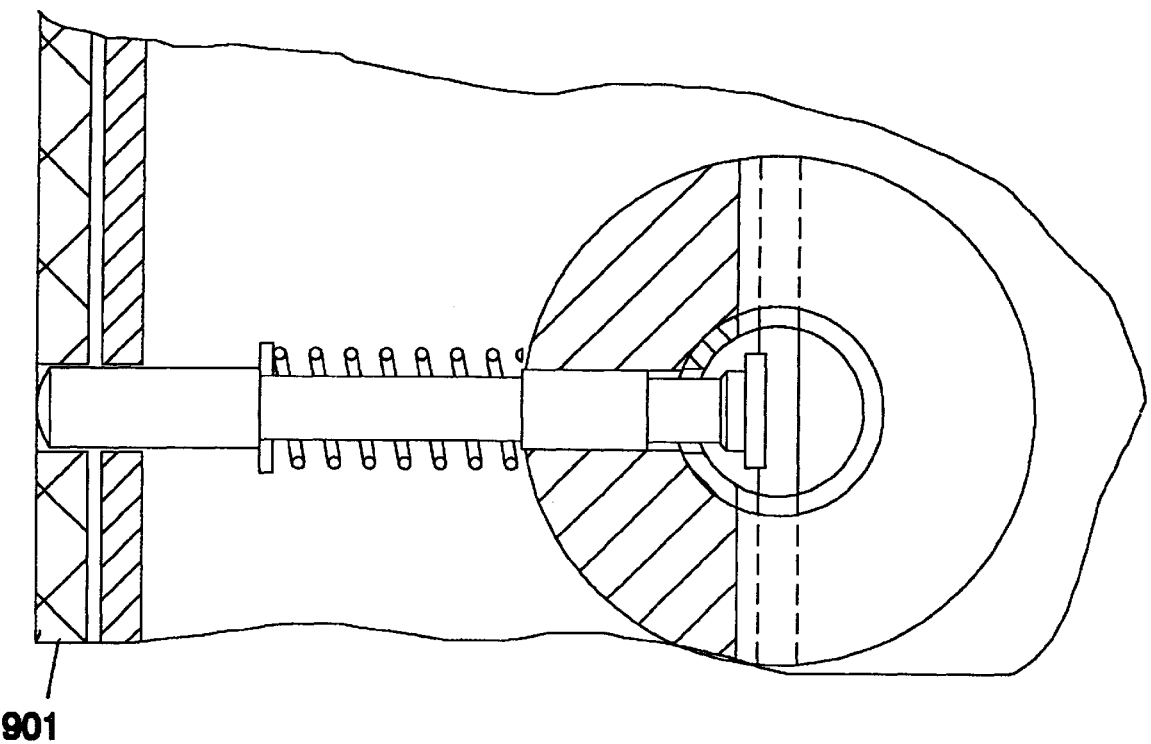
FIG. 11D is a cross sectional view of the airbag module of FIG. 11A taken at 11D—11D.

FIG. 11B is a cross section view, with portions cutaway and removed, of the airbag module of FIG. 11 taken at 11B—11B and illustrates the arming pin 985 which is removed after the module is mounted onto the vehicle. If the module were to be dropped accidentally without this arming pin 985, the sensor could interpret the acceleration from an impact with the floor, for example, as if it were a crash and deploy the airbag. The arming system prevents this from happening by preventing the sensing mass from rotating until the pin 985 is removed.

Figure 12:
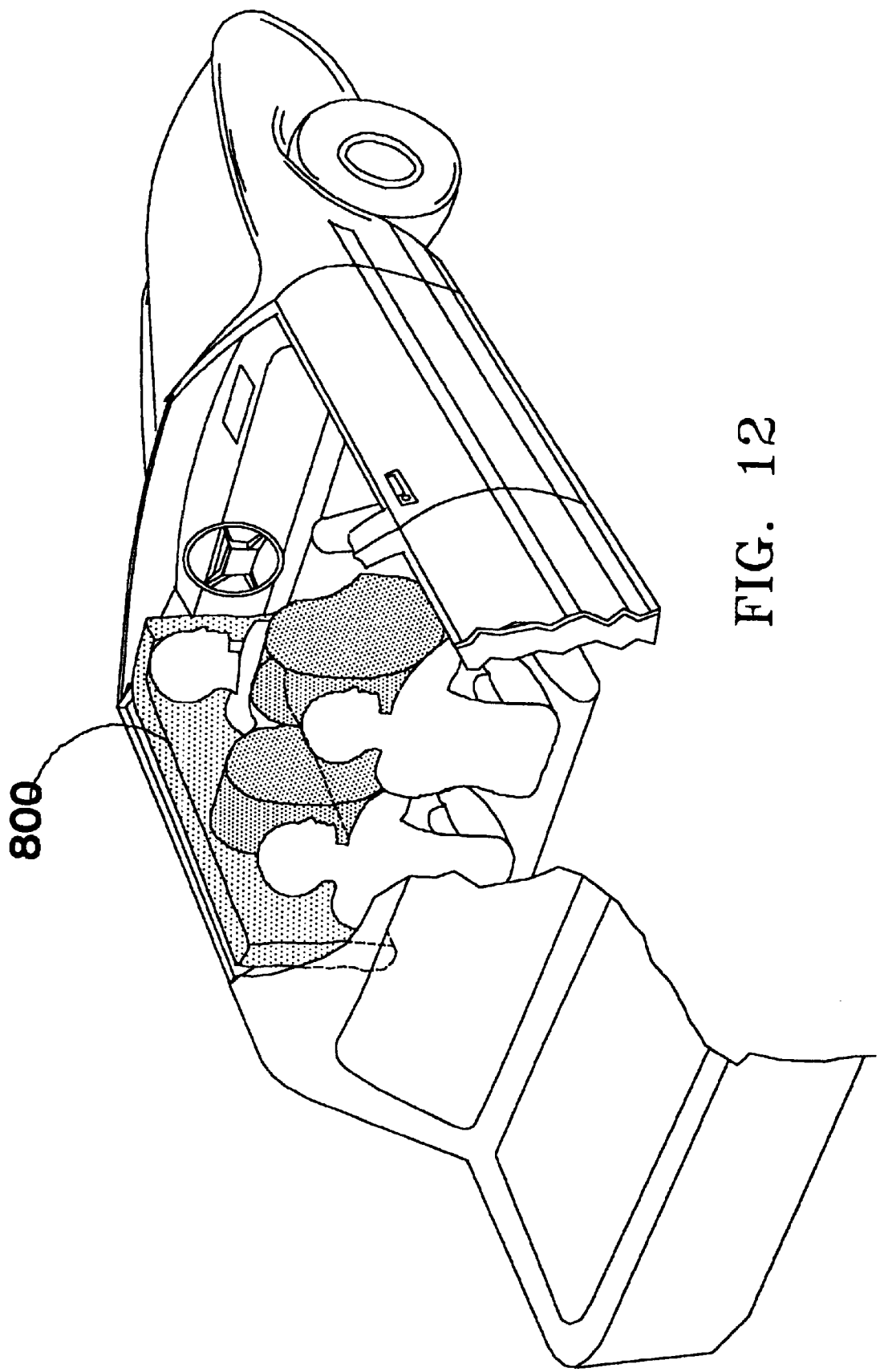
FIG. 12 is a perspective view of another preferred embodiment of the invention shown mounted in a manner to provide protection for a front and a rear seat occupant in side impact collisions, to provide protection against impacts to the roof support pillars in angular frontal impacts and to offer some additional protection against ejection of the occupant or portions of the occupant.

FIG. 12 is a perspective view of another preferred embodiment of the airbag of this invention 1000 shown mounted in a manner to provide protection for a front and a rear seat occupant in side impact collisions and to provide protection against impacts to the roof support pillars in angular frontal impacts and to offer some additional protection against ejection of the occupant.

As an alternate to providing a fixed vent hole as illustrated in the previous examples, a variable vent hole can be provided as shown in FIGS. 13 and 13A, FIG. 13 being a partial cutaway perspective view of a driver side airbag made from film having a variable vent in the seam of the airbag. In this embodiment of an airbag, a hinged elastic member or flap 1370 is biased so that it tends to maintain vent 1360 in a closed position. As pressure rises within the airbag, the vent 1360 is forced open as shown in FIG. 13 and FIG. 13A, which is a detail of the vent 1360 shown in FIG. 13 taken along line 13A—13A of FIG. 13. This construction enables the use of a smaller inflator and also reduces the maximum chest acceleration of the occupant in a crash and more accurately controls the deceleration of the occupant. In FIGS. 13 and 13A, vent 1360 contains a opening 1366 formed between film layer 1368 and reinforcement member 1364. Film layer 1362 is also sealed to reinforcing member 1364. Member 1370 is attached to reinforcing member 1364 through film 1368. A weakened section 1372 is formed in member 1370 to act as a hinge. The elasticity of the material, which may be either metal or fiber reinforced plastic or other suitable material, is used to provide the biasing force tending to hold the variable opening closed.

Figure 14:
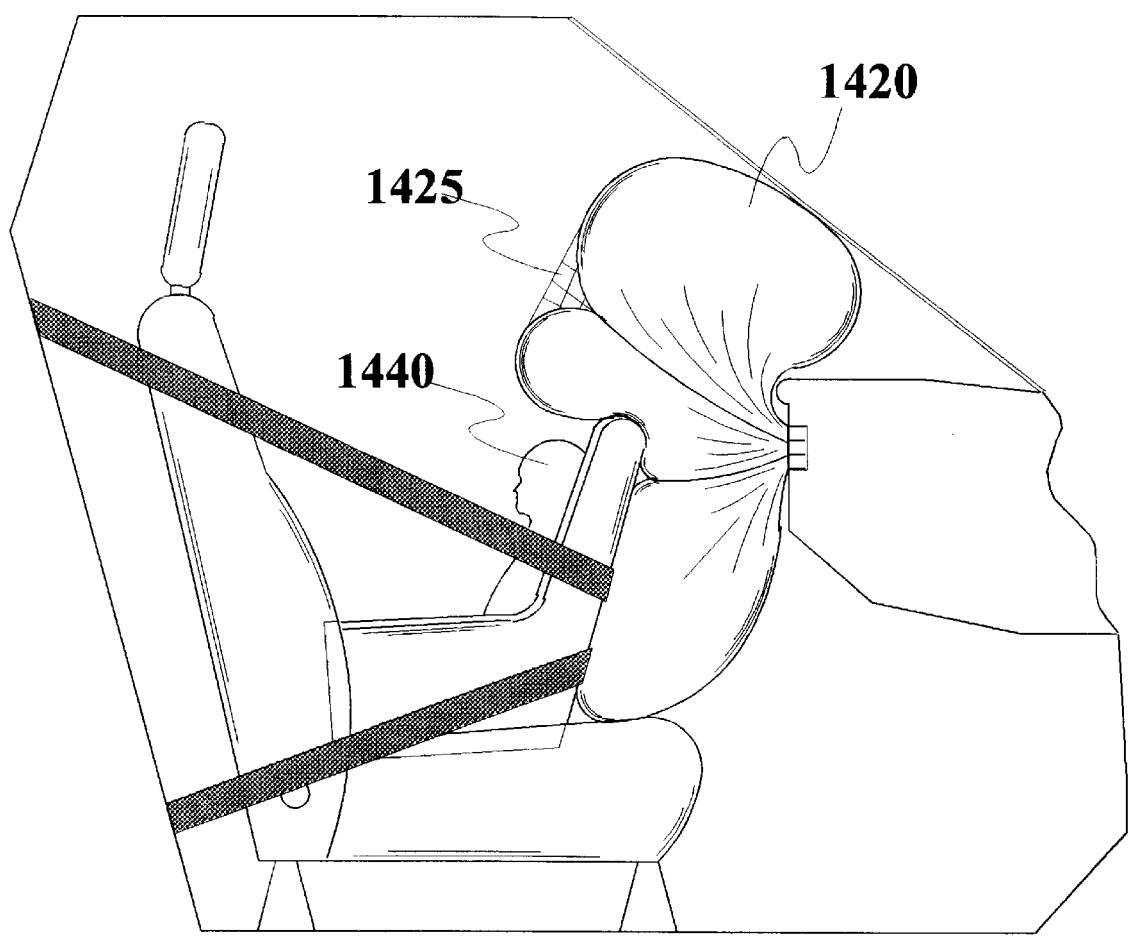
FIG. 14 is a perspective view of a self limiting airbag system composed of a multiplicity of airbags surrounded by a net, most of which has been cutaway and removed, designed to not cause injury to a child in a rear facing child seat.

In FIG. 14, the advantages of the self limiting airbag system disclosed herein and in more detail in copending patent application Ser. No. 08/571,247 and with reference to FIG. 8 above, when used with a rear facing child seat, are illustrated. In this case, where multiple film airbags are illustrated, the airbags deploy but the deployment process stops when each of the film airbags interacts with the child seat and the pressure within each bag rises to where the flow is stopped. In this case, the child 1440 is surrounded by airbags 1420 and further protected from the accident rather than being injured as is the case with current design airbags. The airbags 1420 are additionally surrounded by a net 1425 most of which has been cutaway and removed in the figure. Naturally, in other implementations a single airbag will be used in place of the multiple airbags illustrated here.

The self-limiting feature is illustrated here by either a variable orifice exhaust port in the airbag or, preferably, provision is made in the airbag inflator itself as illustrated in the referenced patent application where a close-down of the aspiration system is used during the deployment portion of the process and a smaller variable orifice is used during the deflation portion. The aspiration cutoff can be designed so that the airbag deploys until the pressure begins to rise within the bag which then stops the inflation process, closes the aspiration ports and the airbag then becomes stiffer to absorb the kinetic energy of the impacting occupant. Thus, during the deployment phase, very little force is placed in the occupant, or the child seat, but as the occupant begins to move into and load the airbag, substantial force is provided to limit his or her motion.

Figure 15:
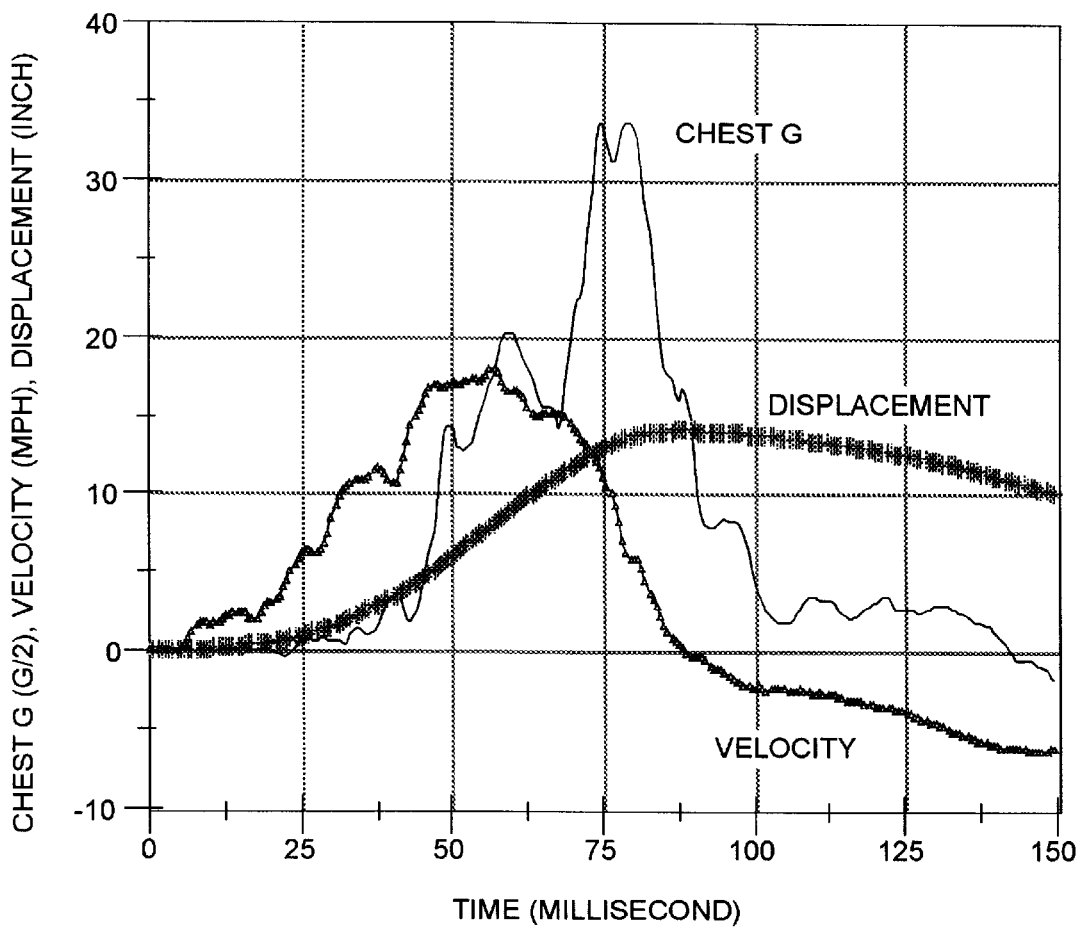
FIG. 15 shows a plot of the chest acceleration of an occupant and the occupant motion using a conventional airbag.
Figure 16:
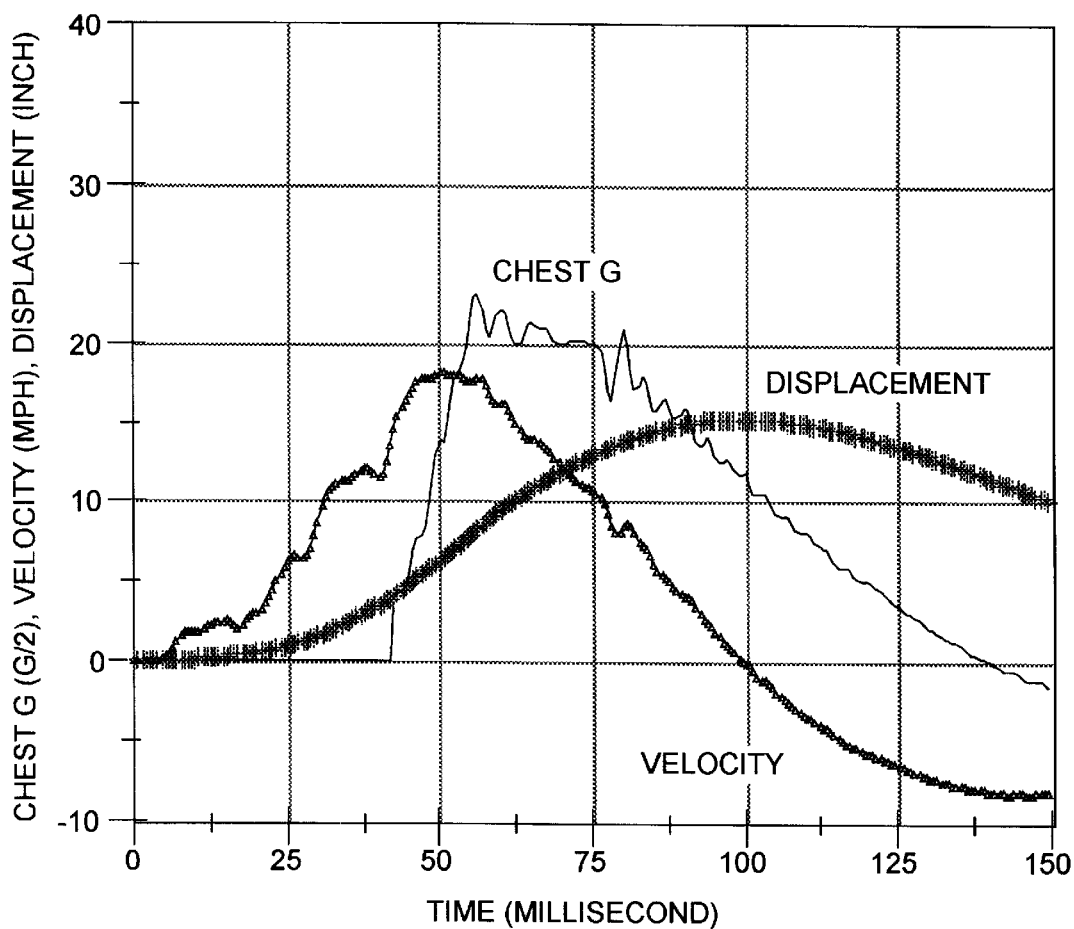
FIG. 16 shows the chest acceleration of an occupant and the resulting occupant motion when the variable orifice of this invention is utilized.

FIG. 15 shows a typical chest G pulse experienced by an occupant and the resulting occupant motion when impacting an airbag during a 35-MPH frontal impact in a small vehicle. When the variable orifice airbag is used in place of the conventional airbag, the chest acceleration curve is limited and takes the shape similar to a simulation result shown in FIG. 16. Since it is the magnitude of the chest acceleration that injures the occupant, the injury potential of the airbag in FIG. 16 is substantially less than that of FIG. 15.

Since the variable exhaust orifice remains closed as long as the pressure in the airbag remains below the set value, the inflator need only produce sufficient gas to fill the airbag once. This is approximately half of a gas which is currently produced by standard inflators. Thus, the use of a variable orifice significantly reduces the total gas requirement and therefore the size, cost and weight of the inflator. Similarly, since the total amount of gas produced by all inflators in the vehicle is cut approximately in half, the total amount of contaminants and irritants is similarly reduced or alternately each inflator used with the variable orifice airbag is now permitted to be somewhat dirtier than current inflators without exceeding the total quantity of contaminants in the environment. This in turn, permits the inflator to be operated with less filtering, thus reducing the size and cost of the inflator.

The characteristics of inflators vary significantly with temperature. Thus, the mass flow rate of gas into the airbag similarly is a significant function of the temperature of the inflator. In conventional fixed orifice airbags, the gas begins flowing out of the airbag as soon as positive pressure is achieved. Thus, the average pressure in the airbag similarly varies significantly with temperature. The use of a variable orifice system as taught by this invention however, permits the bags to be inflated to the same pressure regardless of the temperature of the inflator. Thus, the airbag system will perform essentially the same whether operated at cold or hot temperature, removing one of the most significant variables in airbag performance. The airbag of this invention provides a system which will function essentially the same at both cold and hot temperatures.

The variable orifice airbag similarly solves the dual impact problem where the first impact is sufficient to trigger the crash sensors in a marginal crash where the occupant is wearing a seatbelt and does not interact with the airbag. A short time later in a subsequent more serious accident, the airbag will still be available to protect the occupant. In conventional airbags using a fixed orifice the gas generator may have stopped producing gas and the airbag may have become deflated.

Since the total area available for exhausting gas from the airbag can be substantially larger in the variable orifice airbag, a certain amount of protection for the out-of-position occupant is achieved even when the aspiration system of the referenced copending application is not used. If the occupant is close to the airbag when it deploys, the pressure will begin to build rapidly in the airbag. Since there is insufficient time for the gas to be exhausted through the fixed orifices, this high pressure results in high accelerations on the occupant's chest and can cause injury. In the variable orifice embodiment, however, the pressure will reach a certain maximum in the airbag and then the valve would open to exhaust the gas as fast as the gas generator is pumping gas into the airbag thus maintaining a constant and lower pressure than in the former case. Naturally, the bag must be sufficiently deployed for the valve to be uncovered so that it can operate. Alternately, the valving system can be placed in the inflator and caused to open even before the cover opens thereby handling the case where the occupant is already against the deployment door when the airbag deployment is initiated.

Many geometries can be used to achieve a variable orifice in an airbag. These include very crude systems such as slits placed in the bag in place of round exhaust vents, rubber patches containing one or more holes which are sewn into the bag such that the hole diameter gets larger as the rubber stretches in response to pressure in the bag, plus a whole variety of flapper valves similar to that disclosed in this invention. Slit systems, however, have not worked well in experiments and rubber patches are effected by temperature and thus are suitable only for very crude systems. Similarly, the bag itself could be made from a knitted material, which has the property that its porosity is a function of the pressure in the bag. Thus, once again, the total amount of gas flowing through the bag becomes a function of the pressure in the bag.

Although the case where the pressure is essentially maintained constant in the bag through the opening of a valve has been illustrated, it is possible that for some applications a different function of the pressure in the bag may be desirable. Thus, a combination of a fixed orifice and variable valve might be desirable. The purpose of adjusting the opening area of an airbag vent hole is to control the gas flow rate out of the vent hole according to the pressure inside the airbag. If the pressure is higher, then the area of the vent hole becomes larger and allows more gas to flow out. By regulating the pressure inside an airbag, the force applied on an occupant is minimized.

There has thus been shown and described an airbag system with a self-limiting and self-shaping airbag which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims. For example, the present invention describes numerous different airbag constructions as well as different methods for fabricating airbags. It is within the scope of the invention that all of the disclosed airbags can, for the most part, be made by any of the methods disclosed herein. Thus, in one typical process for constructing a film airbag having at least two compartments, either isolated from one another, within one another or in flow communication with each other, at least one flat panel of film airbag material is provided and then manipulated, processed or worked to form the different compartments. More particularly, the flat panel is joined at appropriate locations to form the different compartments, e.g., by heat sealing or an adhesive. The compartments may be any shape disclosed herein, e.g., tubular-shaped.

Further, there has been shown and described an airbag system with a film airbag utilizing a film material which comprises at least one layer of a thermoplastic elastomer film material which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims. For example, the present invention describes numerous different airbag constructions as well as different methods for fabricating airbags and different applications of the resulting airbags. It is within the scope of the invention that all of the disclosed airbags can, for the most part, be made by any of the methods disclosed herein. Thus, in one typical process for constructing a film airbag having at least two compartments, either isolated from one another, within one another or in flow communication with each other, at least one flat panel of film airbag material is provided and then manipulated, processed or worked to form the different compartments. More particularly, the flat panel is joined at appropriate locations to form the different compartments, e.g., by heat sealing or an adhesive. The compartments may be any shape disclosed herein, e.g., tubular-shaped.

With respect to the construction of the airbag as shown in FIGS. 3C and 3D, another method of obtaining the airbag with a variable thickness is to provide an initial, substantially uniformly thick film substrate (inelastic film) and thereafter applying a coating (a thermoplastic elastomer) thereon in predetermined locations on the substrate, preferably in an organized predetermined pattern, such that it is possible to obtain thicker portions in comparison to other uncoated portions. In this manner, the film airbag can be provided with distinct thicknesses at different locations, e.g., thicker portions which constitute rings and ribs (i.e., the polar symmetric pattern of FIG. 3C), or only at specific locations where it is determined that higher stresses arise during deployment for which reinforcements by means of the thicker film is desired. An alternative fabrication method would be to produce the airbag from thermoplastic elastomeric material with an initial varying thickness as well as a layer of inelastic film to provide the airbag with the desired shape. In this regard, plastic-manufacturing equipment currently exists to generate a plastic sheet with a variable thickness. Such equipment could be operated to provide an airbag having thicker portions arranged in rings and ribs as shown in FIG. 3C.

Lastly, the limiting net described above may be used to limit the deployment of any and all of the airbag described herein, including embodiments wherein there is only a single airbag.

I claim:

1. In a vehicle having an inflatable occupant protection system, an inflatable occupant restraint module comprising:
    a housing mounted in the vehicle and having an interior;
    a deployable airbag contained within said housing interior prior to deployment, said airbag comprising at least one non-perforated sheet of film defining an airbag interior and tear propagation arresting means arranged in connection with said at least one film sheet for arresting the propagation of a tear in said at least one film sheet, said tear propagation arresting means comprising a thermoplastic elastomeric material arranged at specific locations such that said locations are thicker in comparison to an average thickness of said at least one film sheet,
    an inflator coupled to said housing for inflating said airbag, said inflator comprising gas supply means for supplying a gas into the airbag interior defined by said at least one sheet of film, said airbag being attached to and in fluid communication with said inflator; and
    an initiator for initiating said gas supply means to supply the gas into the airbag interior in response to a crash of the vehicle.

2. The module in accordance with claim 1, wherein said thermoplastic elastomeric material is arranged in a predetermined pattern.

3. The module in accordance with claim 2, wherein said at least one film sheet comprises first and second substantially circular film sheets attached to one another to define the airbag interior between said first and second film sheets, said pattern comprising circular rings coaxial with a central axis of said first and second film sheets and ribs arranged to intersect said rings at an angle of about 90 degrees.

4. The module in accordance with claim 1, wherein said thermoplastic elastomeric material is polyurethane.

5. A method for protecting an occupant in a crash by means of an inflatable restraint, comprising the steps of:
    arranging an inflatable airbag comprising at least one sheet of film in a housing,
    arranging in connection with said at least one film sheet a thermoplastic elastomeric material at specific locations such that said locations are thicker in comparison to an average thickness of said at least one film sheet,
    selecting said locations at which the thermoplastic elastomeric material is arranged in connection with said at least one film sheet in view of considerations of stress on said at least one film sheet during deployment of said airbag, and
    supplying gas into an interior of said airbag in response to a crash of the vehicle.

6. The method of claim 5, wherein the thermoplastic elastomeric material is incorporated in a predetermined pattern in connection with said at least one film sheet.

7. The method of claim 6, wherein said at least one film sheet comprises first and second substantially circular film sheets attached to one another to define the airbag interior between said first and second film sheets, said pattern comprising circular rings coaxial with a central axis of said first and second film sheets and ribs arranged to intersect said rings at an angle of about 90 degrees.

8. In a vehicle having an inflatable occupant protection system, an inflatable occupant restraint module comprising:
    a housing mounted in the vehicle and having an interior;
    a deployable airbag contained within said housing interior prior to deployment, said airbag comprising first and second attached material sheets, each of said first and second sheets comprising at least one layer of non-perforated inelastic film substantially coextensive with said sheet and thermoplastic elastomeric material arranged in connection with said at least one layer of inelastic film and extending over at least a portion of said sheet, said thermoplastic elastomer constituting tear propagation arresting means for arresting the propagation of a tear in said at least one layer of inelastic film,
    an inflator coupled to said housing for inflating said airbag, said inflator comprising gas supply means for supplying a gas into an interior of said airbag defined between said first and second sheets, said airbag being attached to and in fluid communication with said inflator; and an initiator for initiating said gas supply means to supply the gas into the interior of said airbag in response to a crash of the vehicle.

9. The module in accordance with claim 8, wherein the thermoplastic elastomeric material is arranged only in specific locations of said first and second sheets such that said locations are thicker in comparison to an average thickness of said first and second sheets, said locations being selected in view of considerations of stress on said at least one layer of inelastic film during deployment of said airbag.

10. The module in accordance with claim 8, wherein the thermoplastic elastomeric material is arranged in a predetermined pattern.

11. The module in accordance with claim 10, wherein said first and second sheets are substantially circular, said pattern comprising circular rings coaxial with a central axis of said first and second sheets and ribs arranged to intersect said rings at an angle of about 90 degrees.

12. The module in accordance with claim 8, wherein the thermoplastic elastomeric material is arranged in a layer substantially coextensive with and fixedly adhered to said at least one layer of inelastic film.

13. A method for protecting an occupant in a crash by means of an inflatable restraint, comprising the steps of:
arranging an inflatable airbag comprising first and second attached material sheets in a housing, each of said first and second sheets comprising at least one layer of non-perforated inelastic film substantially coextensive with said sheet,
incorporating an elastic material into at least a portion of said first and second sheets, said elastic material being connected to said at least one layer of inelastic film and arresting the propagation of a tear in said at least one layer of inelastic film, and
supplying gas into an interior of said airbag defined between said first and second material sheets in response to a crash of the vehicle.

14. The method in accordance with claim 13, further comprising the step of:
selecting the portion of said first and second sheets into which the elastic material is incorporated in view of considerations of stress on said at least one inelastic film layer during deployment of said airbag.

15. The method in accordance with claim 13, wherein the elastic material is incorporated in a predetermined pattern into said first and second sheets.

16. The method in accordance with claim 15, wherein said first and second sheets are substantially circular, said pattern comprising circular rings coaxial with a central axis of said first and second sheets and ribs arranged to intersect said rings at an angle of about 90 degrees.

17. In a vehicle having an inflatable occupant protection system, an inflatable occupant restraint assembly for protecting an occupant in the event of a crash comprising:
at least one airbag module mounted in the vehicle, said at least one module comprising:
at least two inflatable airbags;
a net surrounding said at least two airbags for retaining said at least two airbags in an interior thereof, said net comprising an interlaced network of material strips and defining an interior volume less than the volume of said at least two airbags when inflated;
inflation means arranged in connection with said at least two airbags for inflating said airbags; and
initiation means for initiating said inflation means in response to the crash of the vehicle.

18. The assembly in accordance with claim 17, wherein each of said at least two airbags is tubular shaped such that a principle axis of each of said at least two airbags is substantially parallel to the principle axis of the others of said at least two airbags.

19. The assembly in accordance with claim 17, wherein said at least two airbags are substantially coextensive with one another and a first one of said at least two airbags is arranged in a second one of said at least two airbags, said inflation means being arranged to inflate said first airbag such that upon inflation of said first airbag, said second airbag is also inflated.

20. The assembly in accordance with claim 17, wherein said at least two airbags each comprise at least one non-perforated sheet of film defining an airbag interior and tear propagation arresting means arranged in connection with said at least one film sheet for arresting the propagation of a tear in said at least one film sheet, said tear propagation arresting means comprising a thermoplastic elastomeric material arranged at specific locations such that said locations are thicker in comparison to an average thickness of said at least one film sheet.

21. In a vehicle having an inflatable occupant protection system, an inflatable occupant restraint module comprising:
a housing having an interior;
an airbag contained within said housing interior prior to deployment, said airbag being attached to said housing;
inflation means coupled to said airbag for inflating said airbag, said inflation means comprising gas supply means in flow communication with an interior of said airbag for supplying a gas into said interior of said airbag;
pressure control means coupled to said airbag for controlling outflow of gas supplied by said gas supply means from said inflated airbag as a function of the pressure within said airbag;
initiation means coupled to said gas supply means for initiating said gas supply means in response to a crash of the vehicle;
mounting means arranged in connection with said module for mounting said module to the vehicle; and
a net surrounding said airbag for limiting the deployment of said airbag, said net defining an interior volume less than the volume of said airbag when inflated.

22. In a vehicle having an inflatable occupant protection system, an inflatable occupant restraint module comprising:
a housing having an interior;
an airbag contained within said housing interior prior to deployment, said airbag being attached to said housing;
inflation means coupled to said airbag for inflating said airbag, said inflation means comprising gas supply means in flow communication with an interior of said airbag for supplying a gas into said interior of said airbag;
pressure control means coupled to said airbag for controlling outflow of gas supplied by said gas supply means from said inflated airbag as a function of the pressure within said airbag, said pressure control means comprising
a movable flap arranged in connection with said airbag to vary a vent opening of said airbag providing a passage between an interior of said airbag and an area exterior of said airbag, said flap being biased to close said vent opening, and
a reinforcement member having a first portion attached to said airbag and a second portion separated from said airbag and defining said vent opening with said airbag;

initiation means coupled to said gas supply means for initiating said gas supply means in response to a crash of the vehicle; and mounting means arranged in connection with said module for mounting said module to the vehicle.

23. In a vehicle having an inflatable occupant protection system, an inflatable occupant restraint module comprising:

a housing having an interior;

an airbag contained within said housing interior prior to deployment, said airbag being attached to said housing and comprising at least one non-perforated sheet of film defining an airbag interior and tear propagation arresting means arranged in connection with said at least one film sheet for arresting the propagation of a tear in said at least one film sheet;

inflation means coupled to said airbag for inflating said airbag, said inflation means comprising gas supply means in flow communication with an interior of said airbag for supplying a gas into said interior of said airbag;

pressure control means coupled to said airbag for controlling outflow of gas supplied by said gas supply means from said inflated airbag as a function of the pressure within said airbag;

initiation means coupled to said gas supply means for initiating said gas supply means in response to a crash of the vehicle; and mounting means arranged in connection with said module for mounting said module to the vehicle.

24. The module in accordance with claim 23, wherein said tear propagation arresting means comprise a thermoplastic elastomeric material arranged at specific locations such that said locations are thicker in comparison to an average thickness of said at least one film sheet.

25. In a vehicle having an inflatable occupant protection system, an inflatable occupant restraint module comprising:

a housing having an interior;

an airbag contained within said housing interior prior to deployment, said airbag being attached to said housing and having a seam;

inflation means coupled to said airbag for inflating said airbag, said inflation means comprising gas supply means in flow communication with an interior of said airbag for supplying a gas into said interior of said airbag;

pressure control means coupled to said airbag for controlling outflow of gas supplied by said gas supply means from said inflated airbag as a function of the pressure within said airbag, said pressure control means being arranged in said seam;

initiation means coupled to said gas supply means for initiating said gas supply means in response to a crash of the vehicle; and mounting means arranged in connection with said module for mounting said module to the vehicle.

26. The module in accordance with claim 25, wherein said airbag is made of two sheets of material joined together to form said seam which extends around at least a portion of the circumference of said airbag.

* * * * *